United States Patent
Tanaka

(10) Patent No.: US 10,237,838 B2
(45) Date of Patent: Mar. 19, 2019

(54) COMMUNICATION DEVICE, COMMUNICATION SYSTEM, CONTROL METHOD, AND NON-TRANSITORY COMPUTER READABLE MEDIUM STORING COMMUNICATION PROGRAM

(71) Applicant: NEC Corporation, Minato-ku, Tokyo (JP)

(72) Inventor: Tomozou Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/327,063

(22) PCT Filed: Jul. 14, 2015

(86) PCT No.: PCT/JP2015/003542
§ 371 (c)(1),
(2) Date: Jan. 18, 2017

(87) PCT Pub. No.: WO2016/021119
PCT Pub. Date: Feb. 11, 2016

(65) Prior Publication Data
US 2017/0150465 A1    May 25, 2017

(30) Foreign Application Priority Data

Aug. 5, 2014 (JP) .................... 2014-159684

(51) Int. Cl.
*H04W 56/00* (2009.01)
*H04L 7/00* (2006.01)
(Continued)

(52) U.S. Cl.
CPC ....... *H04W 56/0015* (2013.01); *H04L 5/0048* (2013.01); *H04L 5/0073* (2013.01);
(Continued)

(58) Field of Classification Search
CPC ............. H04W 56/002; H04W 56/001; H04W 56/0015; H04W 56/0045; H04W 92/20;
(Continued)

(56) References Cited

U.S. PATENT DOCUMENTS

2009/0016420 A1* 1/2009 Kwak .................. H04L 5/0048
375/227
2010/0103949 A1* 4/2010 Jung .................... H04B 7/0447
370/468

(Continued)

FOREIGN PATENT DOCUMENTS

JP     H08-126051 A    5/1996
JP     2010-500794 A   1/2010
(Continued)

OTHER PUBLICATIONS

3rd Generation Partnership Project; Technical Specification Group Radio Access Network; Evolved Universal Terrestrial Radio Access (E-UTRA); Physical channels and modulation (Release 12), 3GPP TS 36.211, V12.2.0 (Jun. 2014).

(Continued)

*Primary Examiner* — Andrew Lai
*Assistant Examiner* — Hoyet H Andrews, III

(57) ABSTRACT

A method for improving the accuracy of synchronization between base stations even when the propagation path condition between the base stations is poor or when noises are large is provided. A base station (100) according to the present invention includes a communication unit (10) configured to receive a first reference signal transmitted from a first base station (101) and a second reference signal transmitted from a communication device (102) different from the first base station (101), and an execution unit (20)

(Continued)

configured to obtain synchronization between the base station (100) and the first base station (101) based on the first and second reference signals.

10 Claims, 21 Drawing Sheets

(51) Int. Cl.
*H04W 92/20* (2009.01)
*H04L 5/00* (2006.01)
(52) U.S. Cl.
CPC ............... *H04L 7/00* (2013.01); *H04W 56/00* (2013.01); *H04W 92/20* (2013.01)
(58) Field of Classification Search
CPC ................ H04W 56/00; H04B 7/2668; H04B 2201/70702; H04L 5/0048; H04L 5/0073; H04L 7/00
See application file for complete search history.

(56) References Cited

U.S. PATENT DOCUMENTS

| | | | |
|---|---|---|---|
| 2010/0110983 A1 | 5/2010 | Fu | |
| 2010/0260168 A1 | 10/2010 | Gheorghiu et al. | |
| 2010/0296491 A1 | 11/2010 | Wang et al. | |
| 2011/0170527 A1 | 7/2011 | Yamamoto et al. | |
| 2012/0020230 A1* | 1/2012 | Chen | H04L 1/0028 370/252 |
| 2012/0106493 A1* | 5/2012 | Noh | H04L 5/0007 370/329 |
| 2013/0003716 A1 | 1/2013 | Nanri et al. | |
| 2013/0201840 A1* | 8/2013 | Sorrentino | H04L 25/0204 370/252 |
| 2013/0301434 A1* | 11/2013 | Krishnamurthy | H04L 1/0026 370/252 |
| 2013/0301542 A1* | 11/2013 | Krishnamurthy | H04W 52/50 370/329 |
| 2013/0322375 A1* | 12/2013 | Chang | H04W 72/0426 370/329 |
| 2014/0050187 A1* | 2/2014 | Nakshima | H04L 5/0048 370/329 |
| 2014/0126567 A1* | 5/2014 | Husain | H04B 7/024 370/350 |
| 2014/0219185 A1* | 8/2014 | Etemad | H04W 76/27 370/329 |
| 2015/0009949 A1* | 1/2015 | Khoryaev | H04W 48/16 370/330 |

FOREIGN PATENT DOCUMENTS

| | | | | |
|---|---|---|---|---|
| JP | 2010-118726 A | | 5/2010 | |
| JP | 2010118726 A | * | 5/2010 | |
| JP | 2010118726 A | * | 5/2010 | |
| JP | 2010-219746 A | | 9/2010 | |
| JP | 2012-506653 A | | 3/2012 | |
| JP | 2012-523767 A | | 10/2012 | |
| WO | 2008/019568 A1 | | 2/2008 | |
| WO | 2010/004830 A1 | | 1/2010 | |
| WO | WO-2010004830 A1 | * | 1/2010 | ......... H04L 27/2655 |
| WO | 2010/048899 A1 | | 5/2010 | |
| WO | WO 2010048899 A1 | * | 5/2010 | .......... H04J 11/0056 |
| WO | WO-2010048899 A1 | * | 5/2010 | .......... H04J 11/0056 |
| WO | 2010/118261 A2 | | 10/2010 | |
| WO | 2011/108202 A1 | | 9/2011 | |

OTHER PUBLICATIONS

3rd Generation Partnership Project; Technical Specification Group Radio Access Network; Small cell enhancements for E-UTRA and E-UTRAN—Physical layer aspects (Release 12), 3GPP TR 36.872, V12.1.0 (Dec. 2013).
International Search Report for PCT Application No. PCT/JP2015/003542, dated Sep. 29, 2015.
Japanese Office Action for JP Application No. 2016-539819 dated Mar. 6, 2018 with English Translation.
Japanese Office Action for JP Application No. 2016-539819 dated Sep. 25, 2018 with English Translation.

* cited by examiner

COMMUNICATION DEVICE, COMMUNICATION SYSTEM, CONTROL METHOD, AND NON-TRANSITORY COMPUTER READABLE MEDIUM STORING COMMUNICATION PROGRAM

This application is a National Stage Entry of PCT/JP2015/003542filed on Jul. 14, 2015, which claims priority from Japanese Patent Application 2014- 159684filed on Aug. 5, 2014, the contents of all of which are incorporated herein by reference, in their entirety.

TECHNICAL FIELD

The disclosure of this specification relates to a communication device, a communication system, a control method, and a communication program in a radio communication network.

BACKGROUND ART

Communication between a base station and a terminal is performed on a radio-frame basis (i.e., a frame-by-frame basis). For example, in Non-patent Literature 1, it is specified that communication between a base station and a terminal is performed on a subframe basis in an LTE (Long Term Evolution) system.

A base station and a terminal include a receiver inside thereof. The receiver receives data at a plurality of timings due to a timing error $t_{tx\_err}$ in data transmission, a multipath propagation delay $t_{prop}$, and so on.

FIGS. 23A and 23B are conceptual diagrams showing a process in which a receiver receives data at a plurality of receiving timings. For example, in FIG. 23A, the receiver receives a subframe #0 at a timing $t_0$ and a timing $t_1$. Note that the timing $t_1$ is later than the timing $t_0$ by a delay $t_{det}$. The delay $t_{det}$ is the sum of the error $t_{tx\_err}$ and the multipath propagation delay $t_{prop}$. Similarly, the receiver receives a subframe #1 at a timing $t_2$ and a timing $t_3$. Note that the timing $t_3$ is later than the timing $t_2$ by the delay $t_{det}$.

The reviver performs a receiving process by extracting data corresponding to one subframe by using the receiving timing $t_0$ or $t_2$ or the timing $t_1$ or $t_3$ as the start of the extraction (i.e., the head of the subframe).

It should be noted that in the state shown in FIG. 23A, the following problem occurs. For example, the receiver starts the extraction of data of the subframe #0 by using the receiving timing $t_1$ as the start of the extraction. Further, the receiver starts the extraction of data of the subframe #1 by using the receiving timing $t_3$ as the start of the extraction. In this case, the receiver extracts the data in such a manner that the head of the subframe #1 received at the receiving timing $t_2$ is mixed with the end of the subframe #0 received at the receiving timing $t_1$. Therefore, the data of the subframe #0 received at the receiving timing $t_1$ overlaps the data of the subframe #1 received at the receiving timing $t_2$. As a result, there is a problem that interference occurs between the subframes due to this overlap and hence the communication quality deteriorates.

As an example of a way to cope with this problem, there is a technique in which a CP (Cyclic Prefix) is added in the head of a symbol included in a subframe. FIG. 23B shows a conceptual diagram in which a CP is added in the head of (i.e., in front of) a symbol included in a subframe. Note that it is assumed that the length of the CP (hereinafter referred to as a "CP length") is larger than the transmission timing error $t_{det}$. For example, the receiver starts the extraction of data of the subframe #0, in which the CP is added, by using the receiving timing $t_1$ as the start of the extraction (i.e., the head of the subframe #0). Further, the receiver starts the extraction of data of the subframe #1, in which the CP is added, by using the receiving timing $t_3$ as the start of the extraction. In the state shown in FIG. 23B, since the CP is added in each of the subframes, the data of the subframe #0 received at the receiving timing $t_1$ does not overlap the data of the subframe #1 received at the receiving timing $t_2$.

However, when the error between the transmission timings of base stations exceeds the CP length, the above-described interference occurs between subframes. Therefore, it is necessary to synchronize the transmission timings of the base stations with each other.

Examples of an ordinary method for obtaining synchronization between base stations (i.e., for synchronizing base stations with each other) include a method using a GPS (Global Positioning System), IEEE 1558 v2, or a reference signal.

The following are disadvantages and advantages of the aforementioned method.

Firstly, when the GPS is used for synchronization between base stations, a GPS device needs to be installed in the base stations. However, the installation of the GPS device could increase the cost for the base stations. Further, there is a problem that synchronization between base stations cannot be obtained by the GPS in an environment where a radio wave from a GPS satellite cannot be received, such as an indoor environment.

Next, when IEEE 1558 v2 is used for synchronization between base stations, the synchronization between the base stations is obtained through wired backhaul. Therefore, there is a problem that when there is a delay in the backhaul, the synchronization error becomes larger.

Further, when a reference signal is used for synchronization between base stations, one of the base stations obtains the synchronization by using a reference signal transmitted from the other base station. Since no additional device is required to obtain the synchronization, the cost for the base stations is expected to be reduced. Further, there is no obstacle to obtain synchronization between base stations even when the synchronization is obtained indoors.

As one of examples of a method using a reference signal for synchronization between base stations, Non-patent Literature 2 specifies (i.e., discloses) a so-called Network Listening (NL) method (hereinafter simply referred to as "network listening").

An inter-base-station synchronization method using network listening in related art is described hereinafter.

FIG. 24 shows an ordinary network configuration in network listening. A source BS 1 is a base station based on which synchronization is obtained and a target BS 2 is a base station which is synchronized with the source BS 1. The source BS 1 includes independent synchronization means such as a GPS and hence can obtain accurate synchronization. Further, the source BS 1 transmits a reference signal to the target BS 2 so that synchronization between these base stations can be obtained. In contrast to this, the target BS 2 does not include any independent synchronization means such as a GPS. The target BS 2 synchronizes with the source BS 1 by using the reference signal transmitted from the source BS 1.

CITATION LIST

Non Patent Literature

Non-patent Literature 1: 3GPP TS36.211
Non-patent Literature 2: 3GPP TR36.872

SUMMARY OF INVENTION

Technical Problem

However, in the technique using a reference signal to obtain inter-base-station synchronization as in the case of the technique disclosed in Non-patent Literature 2, when the propagation path condition between the base stations is poor or when noises are large, there is a possibility that the accuracy of the synchronization between the base stations could deteriorate when only one of the base stations attempts to obtain the synchronization by using the reference signal transmitted from the other base station.

Therefore, one of the objects that are achieved by an exemplary embodiment disclosed in this specification is to provide a base station, a method, and a program capable of improving the accuracy of synchronization between base stations even when the propagation path condition between the base stations is poor or when noises are large.

Solution to Problem

A base station according to an exemplary embodiment includes:
a communication unit configured to receive a first reference signal transmitted from a first base station and a second reference signal transmitted from a communication device different from the first base station; and
an execution unit configured to obtain synchronization between the base station and the first base station based on the first and second reference signals.

A communication system according to an exemplary embodiment includes a first base station, a communication device different from the first base station, and a base station, in which
the first base station transmits a first reference signal to the base station,
the communication device transmits a second reference signal to the communication device, and
the base station includes:
  a communication unit configured to receive the first and second reference signals; and
  an execution unit that obtains synchronization between the base station and the first base station based on the first and second reference signals.

A method for a base station according to an exemplary embodiment includes:
a step of receiving a first reference signal transmitted from a first base station and a second reference signal transmitted from a communication device different from the first base station; and
a step of obtaining synchronization between the base station and the first base station based on the first and second reference signals.

A program according to an exemplary embodiment includes:
a step of receiving a first reference signal transmitted from a first base station and a second reference signal transmitted from a communication device different from the first base station; and
a step of obtaining synchronization between the base station and the first base station based on the first and second reference signals.

Advantageous Effects of Invention

According to the above-described exemplary embodiment, it is possible to improve the accuracy of synchronization between base stations even when the propagation path condition between the base stations is poor or when noises are large.

DESCRIPTION OF EMBODIMENTS

Specific exemplary embodiments are explained hereinafter in detail with reference to the drawings. The same symbols are assigned to the same or corresponding elements throughout the drawings, and duplicated explanations are omitted as necessary.

The below-explained plurality of exemplary embodiments may be carried out independently of each other, or may be combined with one another as appropriate and carried out in combination. The below-explained plurality of exemplary embodiments include new features different from each other. Therefore, the below-explained plurality of exemplary embodiments contribute to purposes or solutions of problems different from each other, and contribute to advantageous effects different from each other.

<First Exemplary Embodiment>

Figure 1:
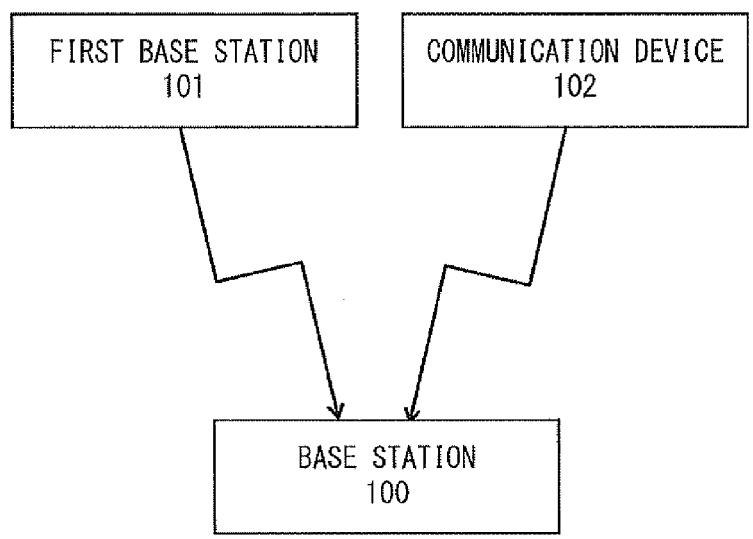
FIG. 1 is a block diagram of a communication system according to a first exemplary embodiment.

FIG. 1 shows a configuration example of a communication system according to this exemplary embodiment. This communication system provides a communication service, e.g., voice communication or packet data communication, or both of them. Referring to FIG. 1, the communication system includes a base station 100, a first base station 101, and a communication device 102. The base station 100 reciprocally (i.e., bidirectionally) communicates with the first base station 101 and the communication device 102.

It should be noted that the communication device 102 means a base station or the like, and attempts to synchronize with the first base station 101.

Figure 2:
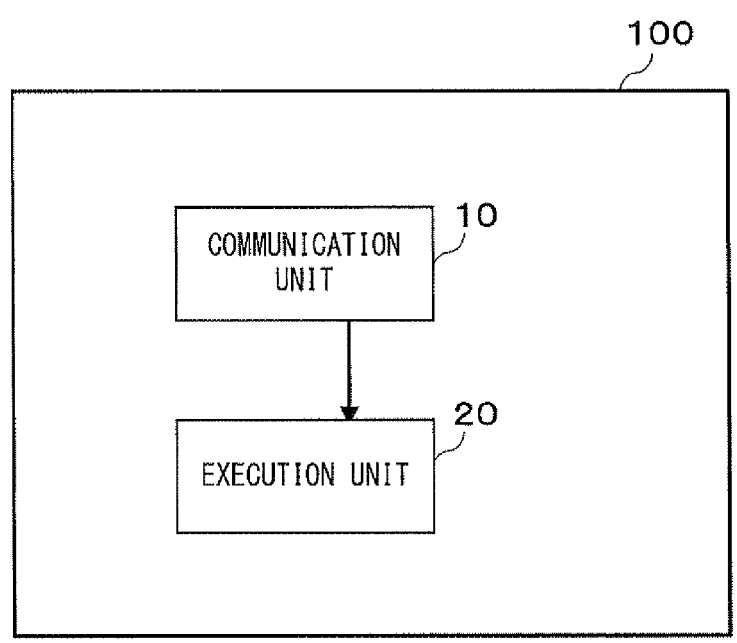
FIG. 2 is a block diagram of a base station according to the first exemplary embodiment.

FIG. 2 shows an example of a configuration of the base station 100 in the first exemplary embodiment.

The base station 100 includes at least a communication unit 10 and an execution unit 20.

The communication unit 10 connects to an external device wirelessly or thorough a wire, and transmits or receive various types of information to/from the external device. In this exemplary embodiment, the communication unit 10 receives a first reference signal transmitted from the first base station 101 and a second reference signal transmitted from the communication device 102.

The execution unit 20 obtains synchronization with the first base station 101 (i.e., synchronizes with the first base station 101) based on the first and second reference signals received by the communication unit 10.

Figure 3:
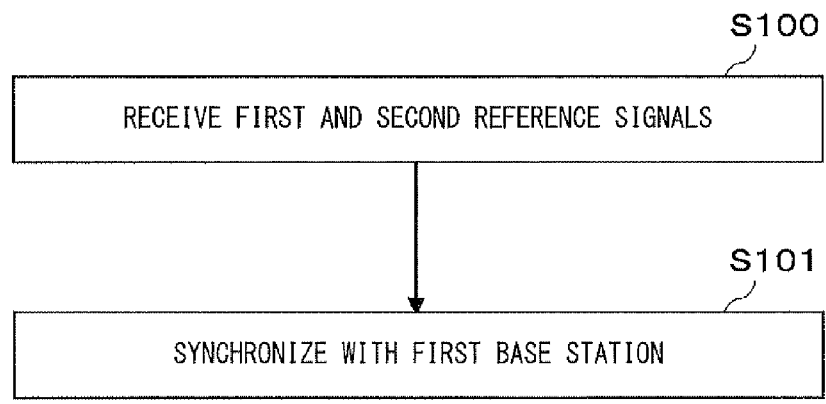
FIG. 3 is a flowchart of operations performed by the base station according to the first exemplary embodiment.

Next, an operation performed by the base station 100 according to this exemplary embodiment is explained with reference to FIG. 3.

In a step S100, the communication unit 10 receives a first reference signal transmitted from the first base station 101 and a second reference signal transmitted from the communication device 102.

In a step S101, the execution unit 20 obtains synchronization with the first base station 101 based on the first and second reference signals received by the communication unit 10 in the step S100.

Through the above-described processes, the base station 100 according to this exemplary embodiment synchronizes with the first base station 101 based on the first reference signal transmitted from the first base station 101 and the second reference signal transmitted from the communication device 102. As a result, it is possible to improve the accuracy of the synchronization between the base station and the first base station 101 even when the propagation path condition between the base station and the first base station 101 is poor or when noises are large.

<Second Exemplary Embodiment>

In this exemplary embodiment, an example in which the configuration and the operation according to above-described first exemplary embodiment are described in a more concrete manner is explained.

Figure 4:
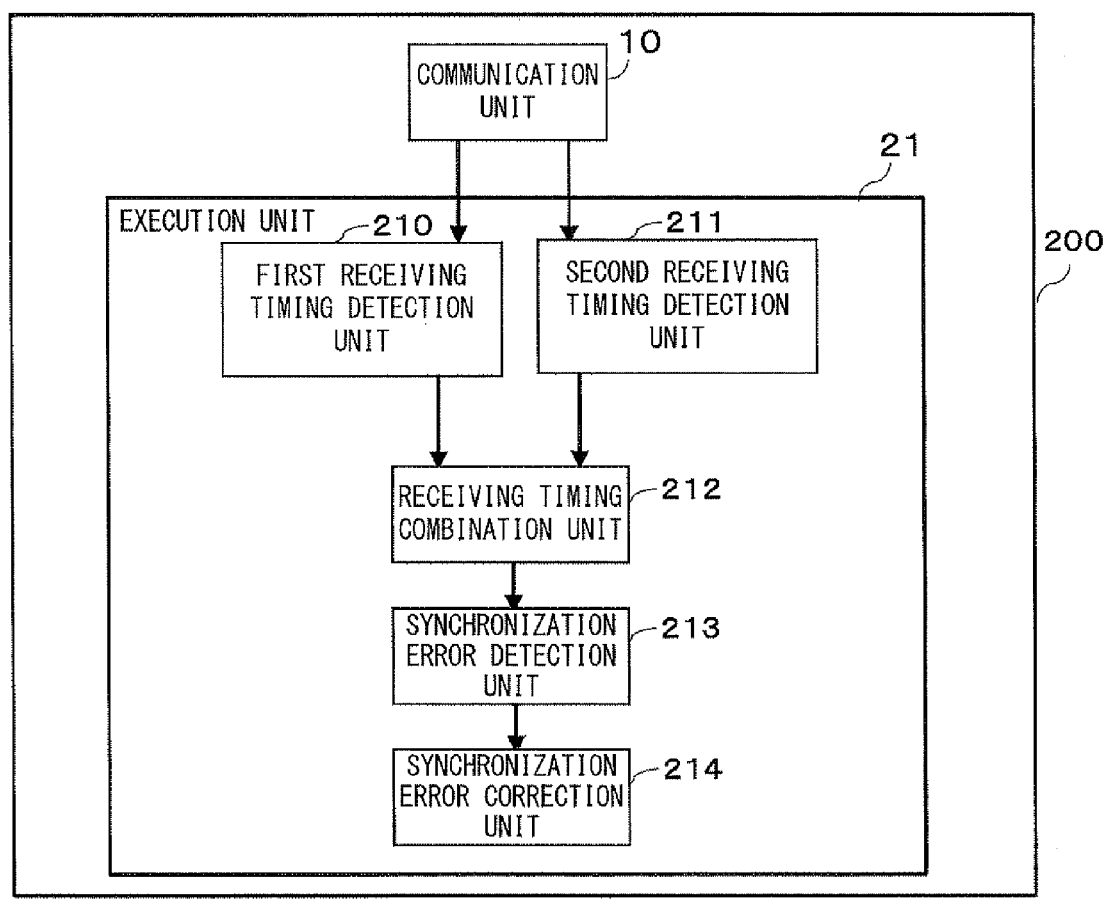
FIG. 4 is a block diagram of a base station according to a second exemplary embodiment.

FIG. 4 shows an example of a configuration of a base station 200 according to a second exemplary embodiment.

The base station 200 includes at least a communication unit 10 and an execution unit 21. The communication unit 10 is similar to that of the first exemplary embodiment.

The execution unit 21 includes at least a first receiving timing detection unit 210, a second receiving timing detection unit 211, a receiving timing combination unit 212, a synchronization error detection unit 213, and a synchronization error correction unit 214.

The first receiving timing detection unit 210 detects a first receiving timing $t_{rx\_1st}$ based on a first reference signal that the communication unit 10 receives from the first base station 101. Specifically, the first receiving timing detection unit 210 generates a power delay profile signal by using the first reference signal received by the communication unit 10 and information about the reference signal of the first base station 101.

Figure 5:
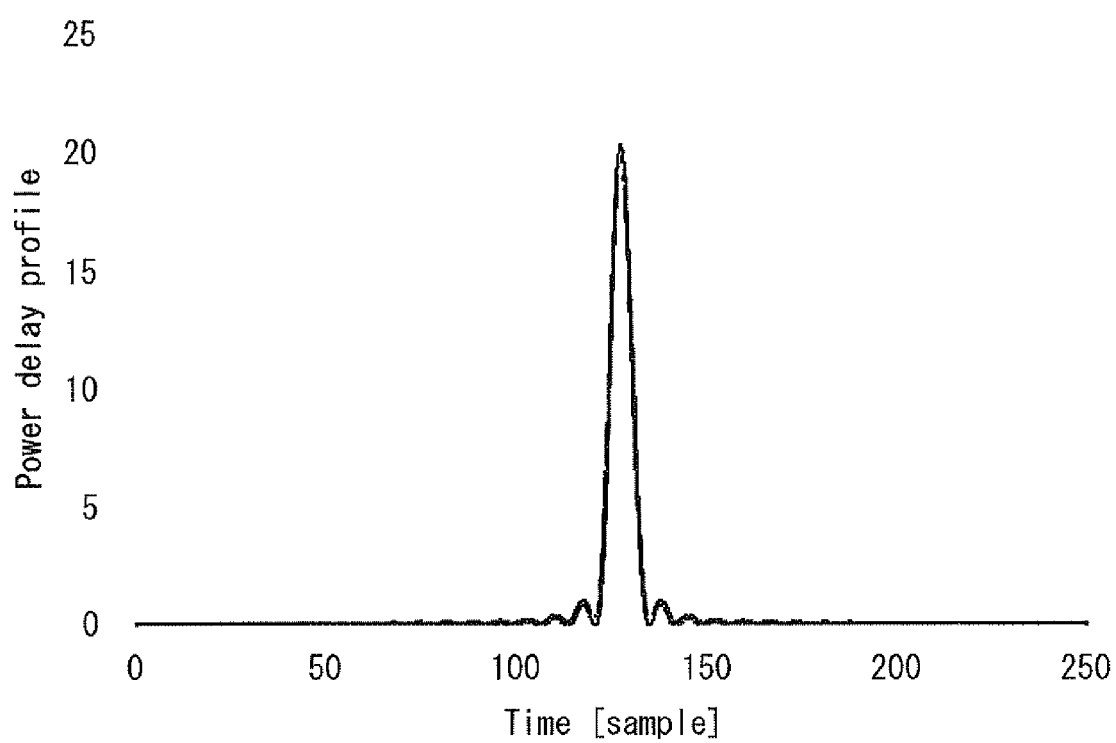
FIG. 5 is an example of a power delay profile signal.

FIG. 5 is an example of the power delay profile signal generated by the first receiving timing detection unit 210. In the graph shown in FIG. 5, the vertical axis indicates signal strengths (Power Delay Profile) and the horizontal axis indicates time (Time). The power delay profile signal has a peak at a timing corresponding to the head of the reference signal. The first receiving timing detection unit 210 detects the timing at which the peak occurs in the power delay profile signal as a first receiving timing $t_{rx\_1st}$.

The second receiving timing detection unit 211 detects a second receiving timing $t_{rx\_2nd}$ based on a second reference signal that the communication unit 10 receives from the communication device 102. The method for detecting the second receiving timing $t_{rx\_2nd}$ is similar to the above-described method performed by the first receiving timing detection unit 210.

The receiving timing combination unit 212 calculates a receiving timing $t_{rx}$ based on the first receiving timing $t_{rx\_1st}$ detected by the first receiving timing detection unit 210 and the second receiving timing $t_{rx\_2nd}$ detected by the second receiving timing detection unit 211.

The synchronization error detection unit 213 calculates a synchronization timing error $t_{err}$ based on the receiving timing $t_{rx}$ calculated by the receiving timing combination unit 212 and a receiving timing $t_{rx\_pre}$ in the past stored in the synchronization error detection unit 213 by using Expression 1.

$$t_{err}=t_{rx}-t_{rx\_pre} \quad \text{(Expression 1)}$$

Note that the past receiving timing $t_{rx\_pre}$ indicates a receiving timing that was calculated by the receiving timing combination unit 212 N times before the operation for calculating the current receiving timing $t_{rx}$ (N is a natural number). When the past receiving timing $t_{rx\_pre}$ is not stored in the synchronization error detection unit 213, the past receiving timing $t_{rx\_pre}$ is defined as zero ($t_{rx\_pre}=0$).

The synchronization error correction unit 214 adjusts a transmitting/receiving timing of its own station (i.e., the base station 200) by using the synchronization timing error $t_{err}$ calculated by the synchronization error detection unit 213. Specifically, when the synchronization timing error $t_{err}$ has a positive value, the synchronization error correction unit 214 controls its own station so that the transmitting timing is delayed. On the other hand, when the synchronization timing error $t_{err}$ has a negative value, the synchronization error correction unit 214 controls its own station so that the transmitting timing is advanced.

Figure 6:
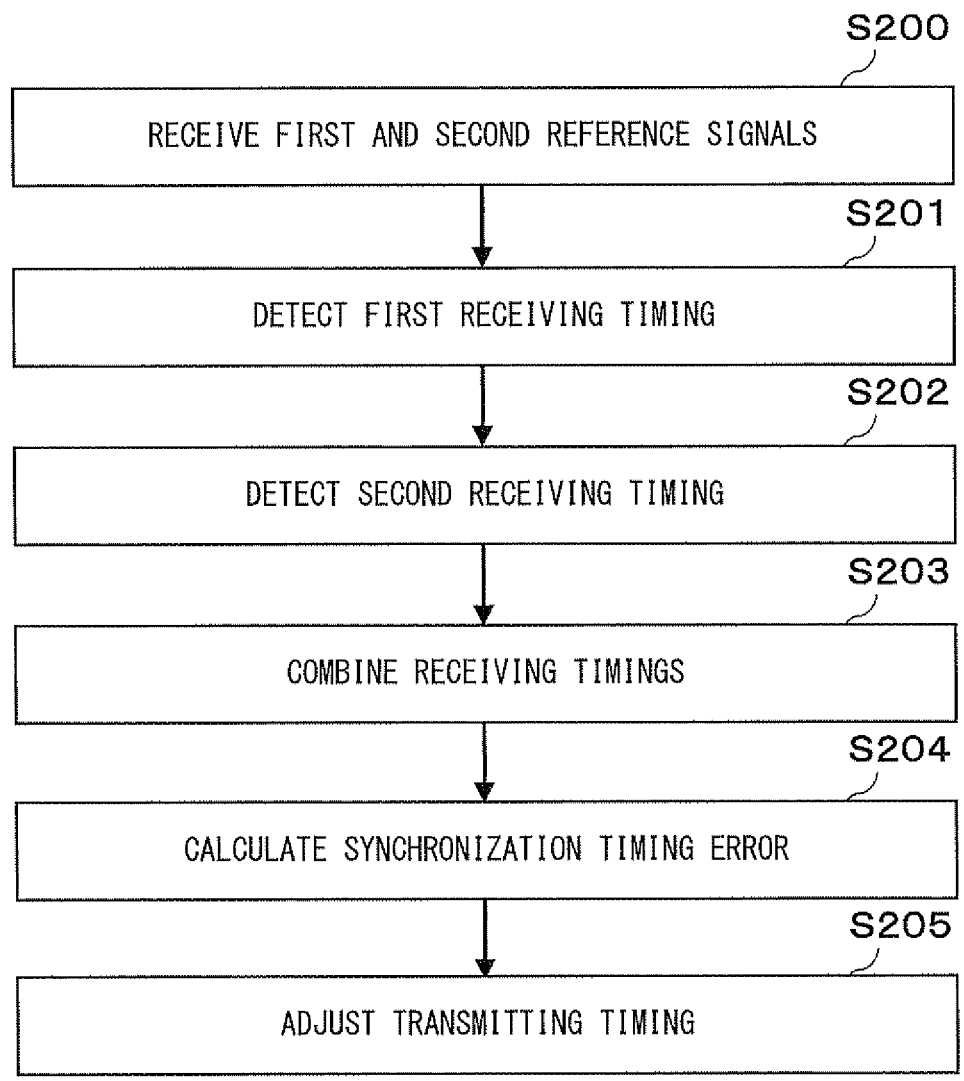
FIG. 6 is a flowchart of operations performed by the base station according to the second exemplary embodiment.

Next, an operation performed by the base station 200 according to this exemplary embodiment is explained with reference to FIG. 6.

A step S200 is similar to the step S100 in the first exemplary embodiment.

In a step S201, the first receiving timing detection unit 210 detects a first receiving timing $t_{rx\_1st}$ based on a first reference signal that the communication unit 10 receives from the first base station 101.

In a step S202, the second receiving timing detection unit 211 detects a second receiving timing $t_{rx\_2nd}$ based on a second reference signal that the communication unit 10 receives from the communication device 102.

In a step S203, the receiving timing combination unit 212 calculates a receiving timing $t_{rx}$ based on the first receiving timing $t_{rx\_1st}$ detected by the first receiving timing detection unit 210 and the second receiving timing $t_{rx\_2nd}$ detected by the second receiving timing detection unit 211.

In a step S204, the synchronization error detection unit 213 calculates a synchronization timing error $t_{err}$ based on the receiving timing $t_{rx}$ calculated by the receiving timing combination unit 212 and a past receiving timing $t_{rx\_pre}$ stored in the synchronization error detection unit 213 by using Expression 1.

In a step S205, the synchronization error correction unit 214 adjusts a transmitting/receiving timing of its own station (i.e., the base station 200) by using the synchronization timing error $t_{err}$ calculated by the synchronization error detection unit 213.

Through the above-described processes, the base station 200 according to this exemplary embodiment synchronizes with the first base station 101 based on the first receiving timing, which is detected based on the first reference signal transmitted from the first base station 101, and the second receiving timing, which is detected based on the second reference signal transmitted from the communication device 102. As a result, it is possible to improve the accuracy of the synchronization between the base station and the first base station 101 even when the propagation path condition between the base station and the first base station 101 is poor or when noises are large.

Further, the following exemplary embodiment is a conceivable modified example of this exemplary embodiment.

Figure 7:
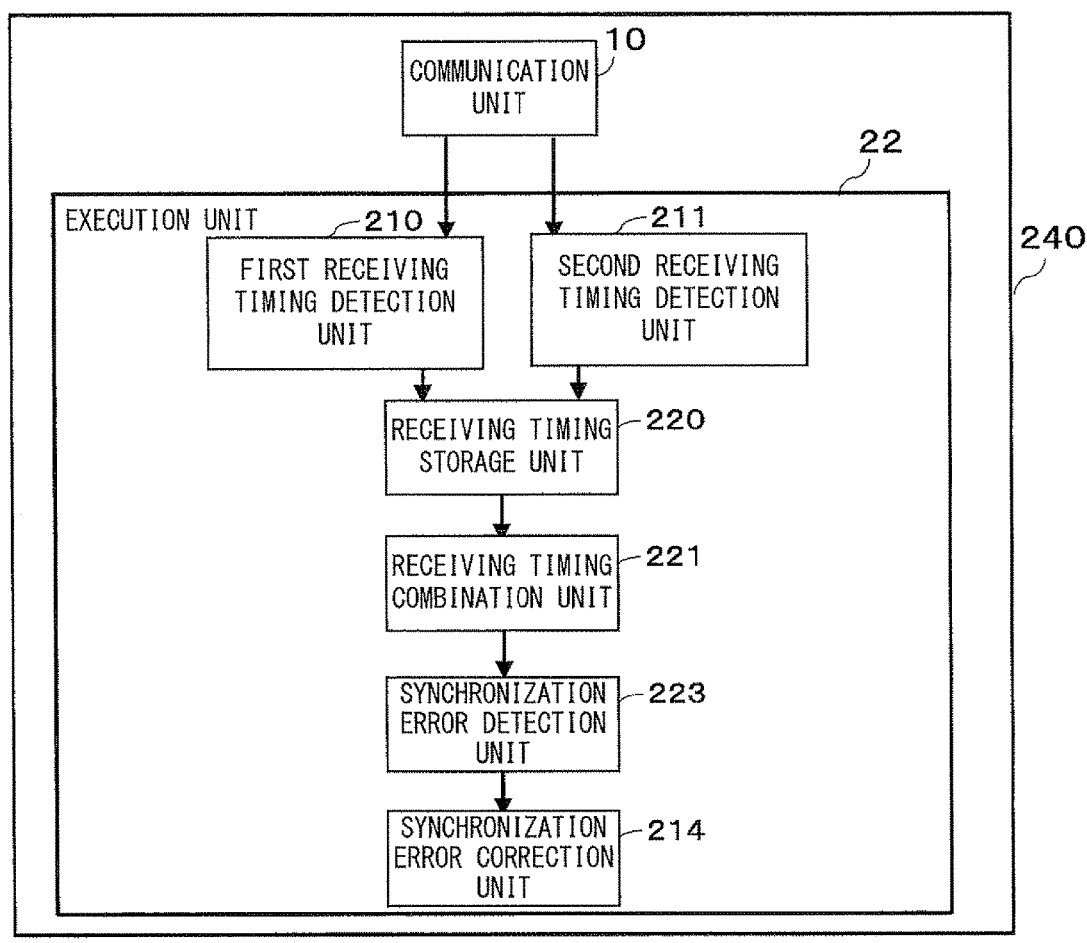
FIG. 7 is a block diagram of a base station according to a modified example of the second exemplary embodiment.

FIG. 7 shows an example of a configuration of a base station 240 according to a modified example of this exemplary embodiment.

The base station 240 includes at least a communication unit 10 and an execution unit 22. The communication unit 10 performs operations similar to those described in the first exemplary embodiment.

The execution unit 22 includes at least a first receiving timing detection unit 210, a second receiving timing detection unit 211, a receiving timing storage unit 220, a receiving timing combination unit 221, a synchronization error detection unit 223, and a synchronization error correction unit 214. The first receiving timing detection unit 210, the second receiving timing detection unit 211, and the synchronization error correction unit 214 perform operations similar to those described in the second exemplary embodiment.

The receiving timing storage unit 220 stores (i.e., retains) a first receiving timing $t_{rx\_1st}$ detected by the first receiving timing detection unit 210 and a second receiving timing $t_{rx\_2nd}$ detected by the second receiving timing detection unit 211 for a specific period. That is, the receiving timing storage unit 220 stores the latest first receiving timing $t_{rx\_1st}$ (N) and the latest second receiving timing $t_{rx\_2nd}$ (N), and a first receiving timing $t_{rx\_1st}$ (i) in the past (i is an integer satisfying a relation "0≤i<N") and a second receiving timing $t_{rx\_2nd}$ (i) in the past (0≤i<N).

It should be noted that the past first receiving timing $t_{rx\_1st}$ (i) means a first receiving timing that the first receiving timing detection unit 210 detected before detecting the latest first receiving timing $t_{rx\_1st}$ (N). Similarly, the past second receiving timing $t_{rx\_2nd}$ (i) means a second receiving timing that the second receiving timing detection unit 211 detected before detecting the latest second receiving timing $t_{rx\_2nd}$ (N).

It should be noted that the past first receiving timing $t_{rx\_1st}$ (i) and the past second receiving timing $t_{rx\_2nd}$ (i) may be corrected as appropriate in order to take account of a clock error with respect to the latest first receiving timing $t_{rx\_1st}$ (N) and the latest second receiving timing $t_{rx\_2nd}$ (N).

The receiving timing combination unit 221 calculates a receiving timing $t_{rx}$ based on the latest first receiving timing $t_{rx\_1st}$ (N) detected by the first receiving timing detection unit 210, the latest second receiving timing $t_{rx\_2nd}$ (N) detected by the second receiving timing detection unit 211, the past first receiving timing $t_{rx\_1st}$ (i) stored in the receiving timing storage unit 220, and the past second receiving timing $t_{rx\_2nd}$ (i) stored in the receiving timing storage unit 220.

The synchronization error detection unit 223 calculates a synchronization timing error $t_{err}$ based on the receiving timing $t_{rx}$ calculated by the receiving timing combination unit 221 and the past receiving timing $t_{rx\_pre}$ stored in the synchronization error detection unit 223 by using Expression 1.

Figure 8:
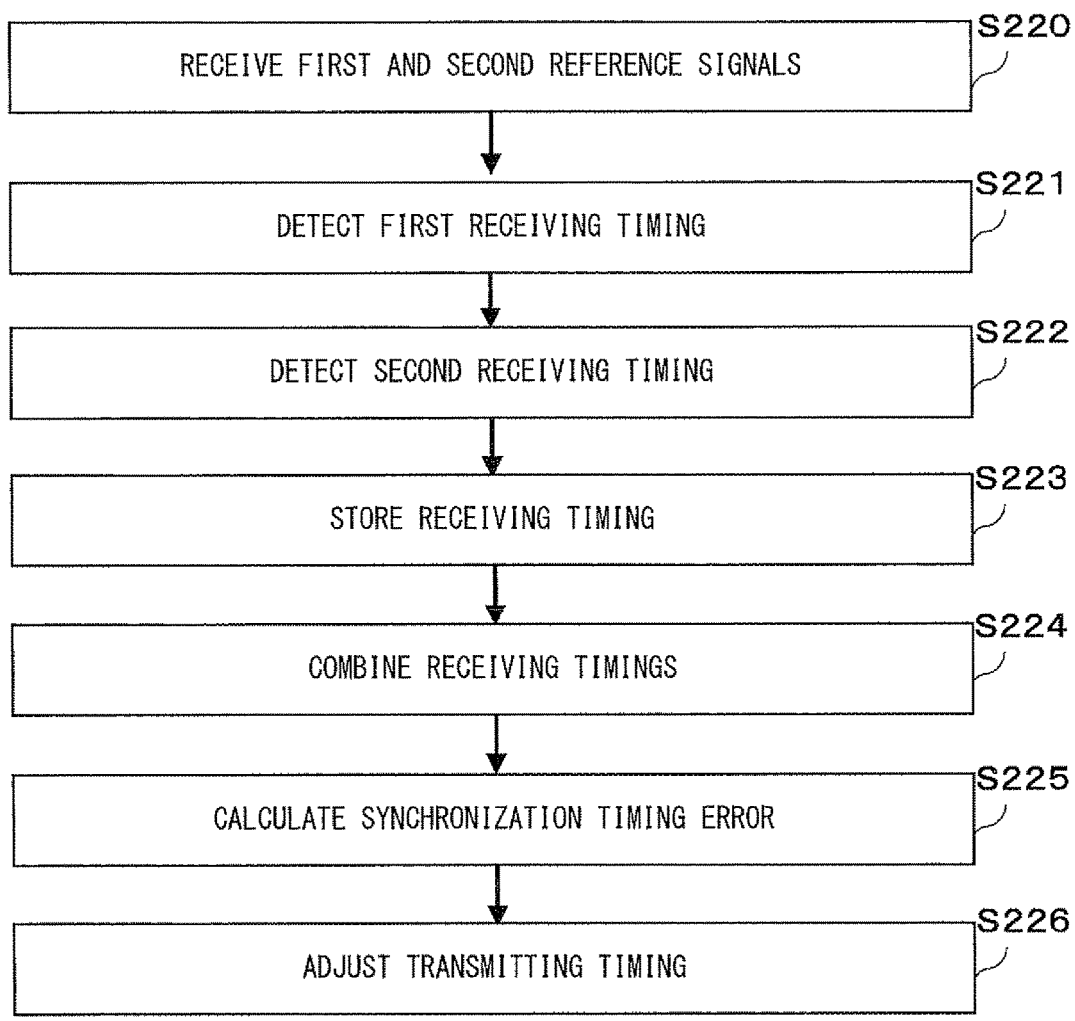
FIG. 8 is a flowchart of operations performed by the base station according to the modified example of the second exemplary embodiment.

Next, an operation performed by the base station 240 according to this exemplary embodiment is explained with reference to FIG. 8.

In steps S220-S222 and S226, operations similar to those in the steps S200-S202 and S205, respectively, described in the second exemplary embodiment are performed.

In a step S223, the receiving timing storage unit 220 stores (i.e., retains) the first receiving timing $t_{rx\_1st}$ detected by the first receiving timing detection unit 210 and the second receiving timing $t_{rx\_2nd}$ detected by the second receiving timing detection unit 211 for a specific period.

In a step S224, the receiving timing combination unit 221 calculates a receiving timing $t_{rx}$ based on the latest first receiving timing $t_{rx\_1st}$ (N) detected by the first receiving timing detection unit 210, the latest second receiving timing $t_{rx\_2nd}$ (N) detected by the second receiving timing detection unit 211, the past first receiving timing $t_{rx\_1st}$ (i) stored in the receiving timing storage unit 220, and the past second receiving timing $t_{rx\_2nd}$ (i) stored in the receiving timing storage unit 220.

In a step S225, the synchronization error detection unit 223 calculates a synchronization timing error $t_{err}$ based on the receiving timing $t_{rx}$ calculated by the receiving timing combination unit 221 and the past receiving timing $t_{rx\_pre}$ stored in the synchronization error detection unit 223 by using Expression 1.

Through the above-described processes, the base station 240 according to this exemplary embodiment synchronizes with the first base station 101 based on the latest first receiving timing and the past first receiving timing, which are detected based on the first reference signal transmitted from the first base station 101, and the latest second receiving timing and the past second receiving timing, which are detected based on the second reference signal transmitted from the communication device 102. As a result, it is possible to improve the accuracy of the synchronization between the base station 240 and the first base station 101 even when the propagation path condition between the base station 240 and the first base station 101 is poor or when noises are large.

Further, the following exemplary embodiment is another conceivable modified example of this exemplary embodiment.

Figure 9:
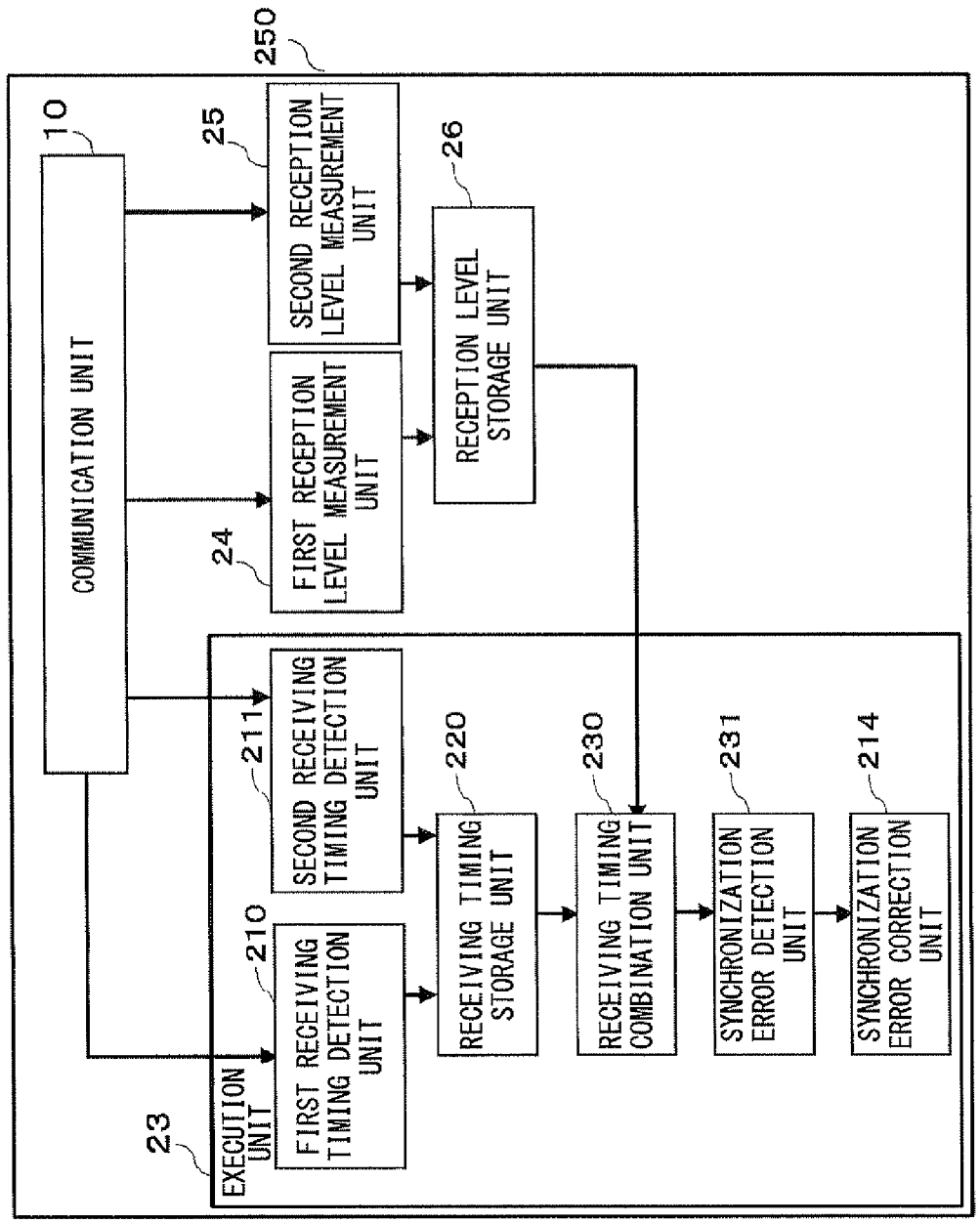
FIG. 9 is a block diagram of a base station according to a modified example of the second exemplary embodiment.

FIG. 9 shows an example of a configuration of a base station 250 according to a modified example of this exemplary embodiment.

The base station 250 includes at least a communication unit 10, an execution unit 23, a first reception level measurement unit 24, a second reception level measurement unit 25, and a reception level storage unit 26. The communication unit 10 performs operations similar to those described in the first exemplary embodiment.

The execution unit 23 includes at least a first receiving timing detection unit 210, a second receiving timing detection unit 211, a receiving timing storage unit 220, a receiving timing combination unit 230, a synchronization error detection unit 231, and a synchronization error correction unit 214. The first receiving timing detection unit 210, the second receiving timing detection unit 211, the receiving timing storage unit 220, and the synchronization error correction unit 214 perform operations similar to those described in the above-described modified example of the second exemplary embodiment.

The first reception level measurement unit 24 measures a first reception level $P_{1st}$ based on a first reference signal that the communication unit 10 receives from the first base station 101. The first reception level $P_{1st}$ is, for example, a value indicating the strength of the first reference signal.

The second reception level measurement unit 25 measures a second reception level $P_{2nd}$ based on a second reference signal that the communication unit 10 receives from the communication device 102. The second reception level $P_{2nd}$ is, for example, a value indicating the strength of the second reference signal.

The reception level storage unit 26 stores (i.e., retains) the first reception level $P_{1st}$ measured by the first reception level measurement unit 24 and the second reception level $P_{2nd}$ measured by the second reception level measurement unit 25 for a specific period. That is, the reception level storage unit 26 stores the latest first reception level $P_{1st}$ (N), the latest second reception level $P_{2nd}$ (N), a first reception level $P_{1st}$ (i) in the past, and a second reception level $P_{2nd}$ (i) in the past.

It should be noted that the past first reception level $P_{1st}$ (i) means a reception level that the first reception level measurement unit 24 measured before measuring the latest first reception level $P_{1st}$ (N). Similarly, the past second reception level $P_{2nd}$ (i) means a reception level that the second reception level measurement unit 25 measured before measuring the latest second reception level $P_{2nd}$ (N).

The receiving timing combination unit 230 calculates a receiving timing $t_{rx}$ based on the latest first receiving timing $t_{rx\_1st}$ (N) and the past first receiving timing $t_{rx\_1st}$ (i) stored in the receiving timing storage unit 220, the latest second receiving timing $t_{rx\_2nd}$ (N) and the past second receiving timing $t_{rx\_2nd}$ (i) stored in the receiving timing storage unit 220, the latest first reception level $P_{1st}$ (N) and the past first reception level $P_{1st}$ (i) stored in the reception level storage unit 26, and the latest second reception level $P_{2nd}$ (N) and the past second reception level $P_{2nd}$ (i) stored in the reception level storage unit 26 by using Expression 2.

$$t_{rx} = \frac{\dfrac{W_{t\_1st}}{N_{fr}} \sum_{i=0}^{N_{fr}-1} P_{1st}(i) \cdot t_{rx\_1st}(i) + \dfrac{W_{t\_2nd}}{N_{fr}} \sum_{i=0}^{N_{fr}-1} P_{2nd}(i) \cdot t_{rx\_2nd}(i)}{\dfrac{W_{t\_1st}}{N_{fr}} \sum_{i=0}^{N_{fr}-1} P_{1st}(i) + \dfrac{W_{t\_2nd}}{N_{fr}} \sum_{i=0}^{N_{fr}-1} P_{2nd}(i)}$$

(Expression 2)

In the expression, $w_{t\_1st}$ and $w_{t\_2nd}$ are weighting coefficients related to the first and second receiving timings, respectively, and can be set as parameters. Further, i represents a subframe number and $N_{fr}$ represents the number of subframes with which a reference signal is received.

The synchronization error detection unit 231 calculates a synchronization timing error $t_{err}$ based on the receiving timing $t_{rx}$ calculated by the receiving timing combination unit 230 and the past receiving timing $t_{rx\_pre}$ stored in the synchronization error detection unit 231 by using Expression 1.

Figure 10:
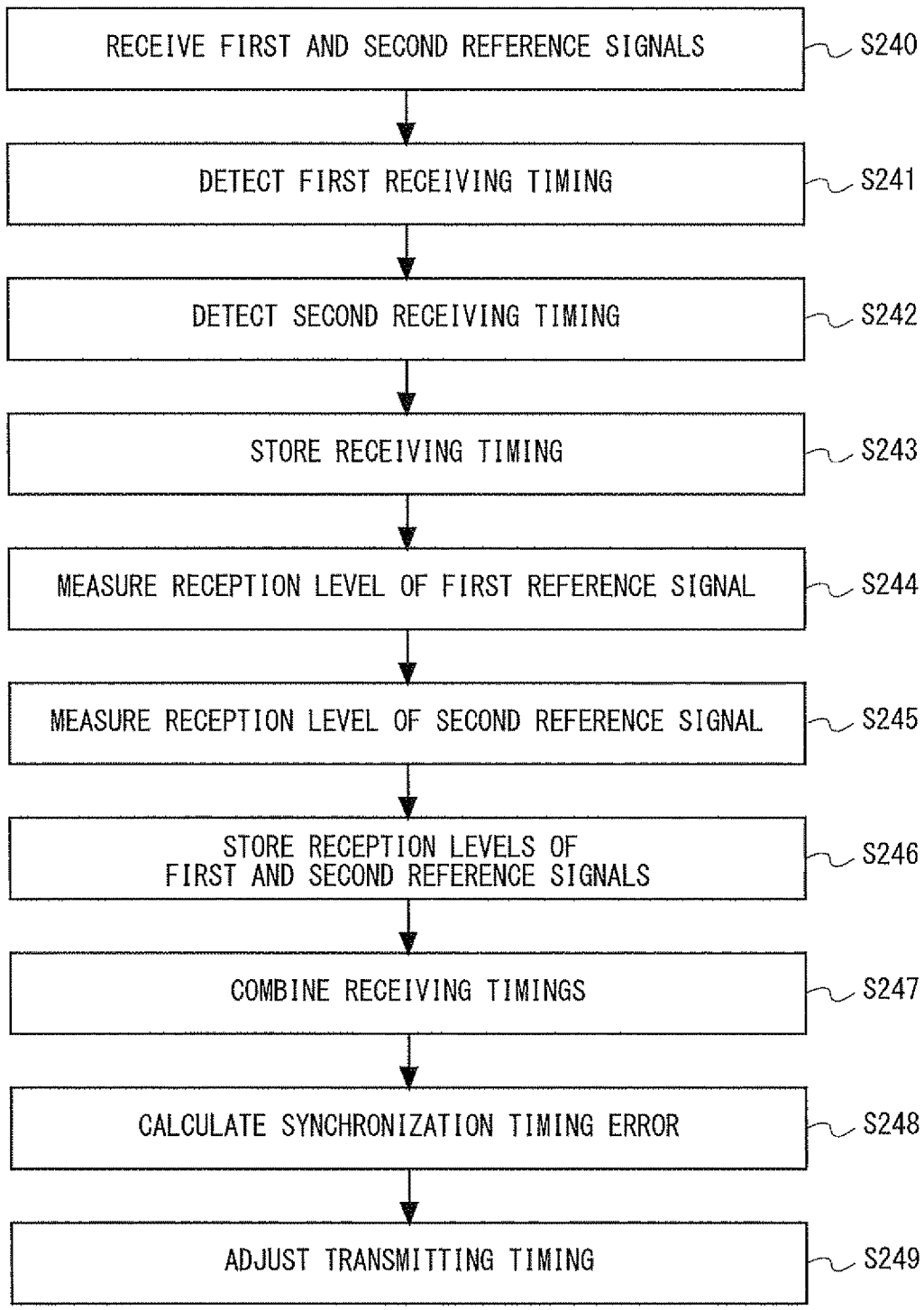
FIG. 10 is a flowchart of operations performed by the base station according to the modified example of the second exemplary embodiment.

Next, an operation performed by the base station 250 according to this exemplary embodiment is explained with reference to FIG. 10.

In steps S240-S243 and S247-249, operations similar to those in the steps S200-S223 and S224-226, respectively, described in the modified example of the second exemplary embodiment are performed.

In a step S244, the first reception level measurement unit 24 measures a first reception level $P_{1st}$ based on a first reference signal that the communication unit 10 receives from the first base station 101.

In a step S245, the second reception level measurement unit 25 measures a second reception level $P_{2nd}$ based on a second reference signal that the communication unit 10 receives from the communication device 102.

In a step S246, the reception level storage unit 26 stores (i.e., retains) the first reception level $P_{1st}$ measured by the first reception level measurement unit 24 and the second reception level $P_{2nd}$ measured by the second reception level measurement unit 25 for a specific period.

Through the above-described processes, the base station 250 according to this exemplary embodiment synchronizes with the first base station 101 by using the first reference signal transmitted from the first base station 101 and the second reference signal transmitted from the communication device 102, and based not only on the latest receiving timing and the past receiving timing of each of these reference signal, but also on the latest reception level and the past reception level of each of these reference signals. As a result, it is possible to improve the accuracy of the synchronization between the base station 250 and the first base station 101 even when the propagation path condition between the base station 250 and the first base station 101 is poor or when noises are large.

<Third Exemplary Embodiment>

In this exemplary embodiment, a modified example of the above-described first or second exemplary embodiment is explained.

Figure 11:
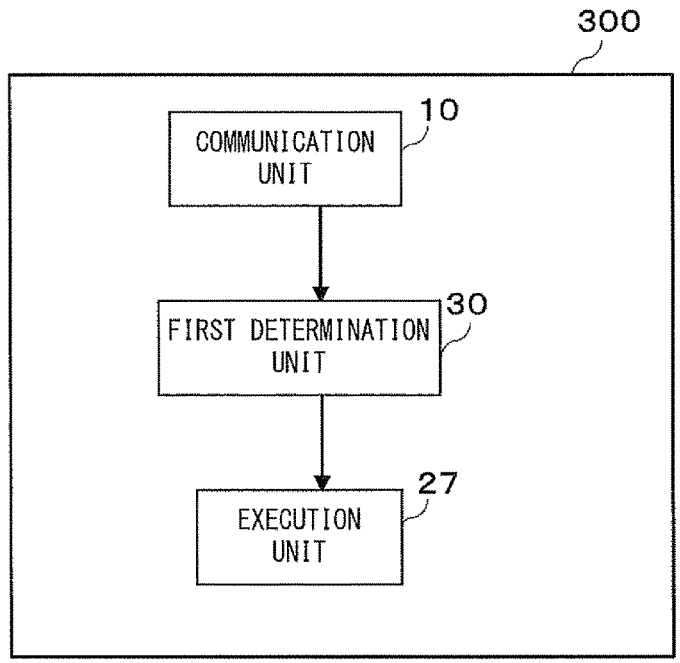
FIG. 11 is a block diagram of a base station according to a third exemplary embodiment.

FIG. 11 shows an example of a configuration of a base station 300 according to a third exemplary embodiment.

The base station 300 includes at least a communication unit 10, an execution unit 27, and a first determination unit 30. The communication unit 10 performs operations similar to those in the first exemplary embodiment.

The first determination unit 30 determines whether or not the base station 300 should synchronize with the first base station 101 based on a first reference signal that the communication unit 10 receives from the first base station 101 and a second reference signal that the communication unit 10 receives from the communication device 102.

The execution unit 27 obtains synchronization with the first base station 101 based on the determination result of the first determination unit 30. The execution unit 27 may be equivalent to the execution unit 20 in the first exemplary embodiment. Alternatively, the execution unit 27 may have functions corresponding to those of the execution unit 21 in the second exemplary embodiment, or the execution unit 22 or the execution unit 23 in the modified example of the second exemplary embodiment.

Figure 12:
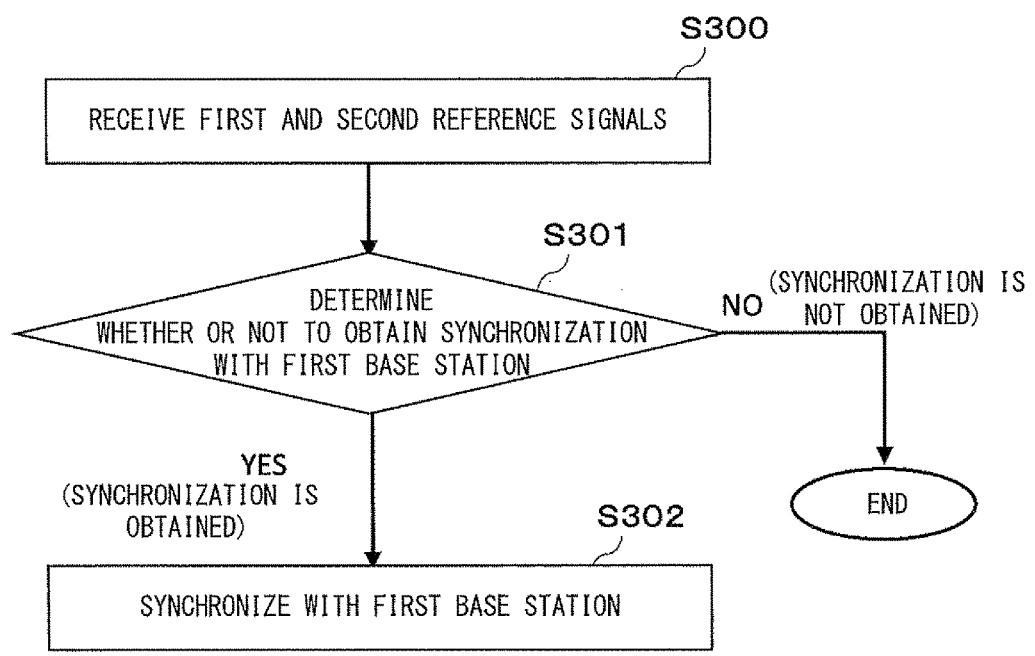
FIG. 12 is a flowchart of operations performed by the base station according to the third exemplary embodiment.

Next, an operation performed by the base station 300 according to this exemplary embodiment is explained with reference to FIG. 12.

A step S300 is similar to the step S100 in the first exemplary embodiment.

In a step S301, the first determination unit 30 determines whether or not the base station 300 should synchronize with the first base station 101 based on a first reference signal that the communication unit 10 receives from the first base station 101 and a second reference signal that the communication unit 10 receives from the communication device 102. When the determination result in the step S301 indicates that "the base station 300 should not synchronize with the first base station 101" (step S301: No), the operation is finished.

On the other hand, when the determination result in the step S301 indicates that "the base station 300 should synchronize with the first base station 301" (step S301: Yes), the process moves to a step S302.

In the step S302, the execution unit 27 obtains synchronization with the first base station 101 based on the determination result of the first determination unit 30 in the step S301.

Through the above-described processes, the base station 300 according to this exemplary embodiment determines whether or not the base station 300 should synchronize with the first base station 101 based on the first reference signal transmitted from the first base station 101 and the second reference signal transmitted from the communication device 102, and synchronizes with the first base station 101 based on the determination result. Therefore, the base station 300 according to this exemplary embodiment can determine whether or not the base station 300 should synchronize with the first base station 101 more accurately.

<Fourth Exemplary Embodiment>

In this exemplary embodiment, an example in which the configuration and the operation according to above-described third exemplary embodiment are described in a more concrete manner is explained.

Figure 13:
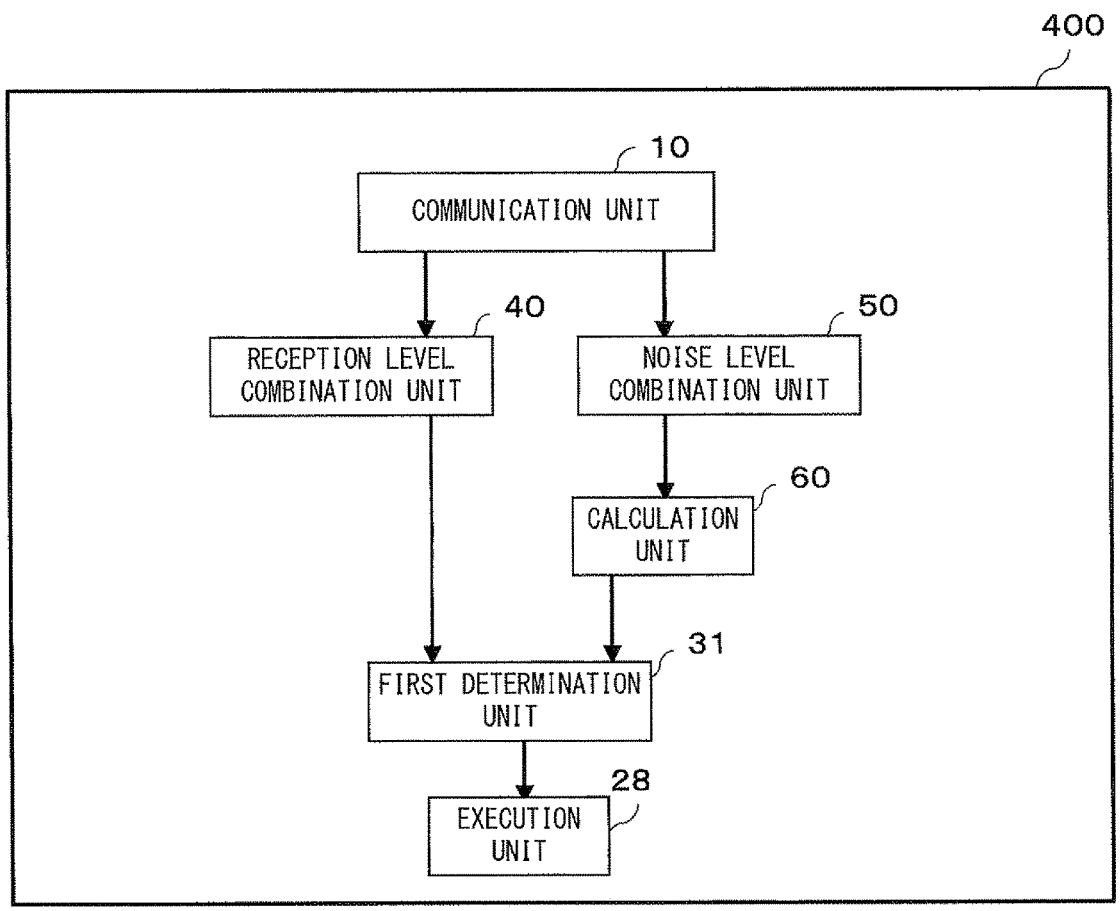
FIG. 13 is a block diagram of a base station according to a fourth exemplary embodiment.

FIG. 13 shows an example of a configuration of a base station 400 according to a fourth exemplary embodiment.

The base station 400 includes at least a communication unit 10, an execution unit 28, a first determination unit 31, a reception level combination unit 40, a noise level combination unit 50, and a calculation unit 60. The communication unit 10 performs operations similar to those in the first exemplary embodiment.

The reception level combination unit 40 calculates a reception level P based on a first reference signal that the communication unit 10 receives from the first base station 101 and a second reference signal that the communication unit 10 receives from the communication device 102.

The noise level combination unit 50 calculates a noise level $\sigma^2$ based on the first reference signal that the communication unit 10 receives from the first base station 101 and the second reference signal that the communication unit 10 receives from the communication device 102. The noise level $\sigma^2$ is, for example, a value indicating the strength of noises.

The calculation unit 60 calculates a first threshold $thr_{det}$ based on the noise level $\sigma^2$ calculated by the noise level combination unit 50 by using Expression 3.

$$thr_{det}=thr_{det\_rel}\times\sigma^2 \qquad \text{(Expression 3)}$$

In the expression, $thr_{det\_rel}$ is a relative detection threshold and can be set as a parameter.

The first determination unit 31 determines whether or not the base station 400 should synchronize with the first base station 101 based on whether or not the reception level P calculated by the reception level combination unit 40 is larger than the first threshold $thr_{det}$ calculated by the calculation unit 60.

The execution unit 28 obtains synchronization with the first base station 101 based on the determination result of the first determination unit 31.

Figure 14:
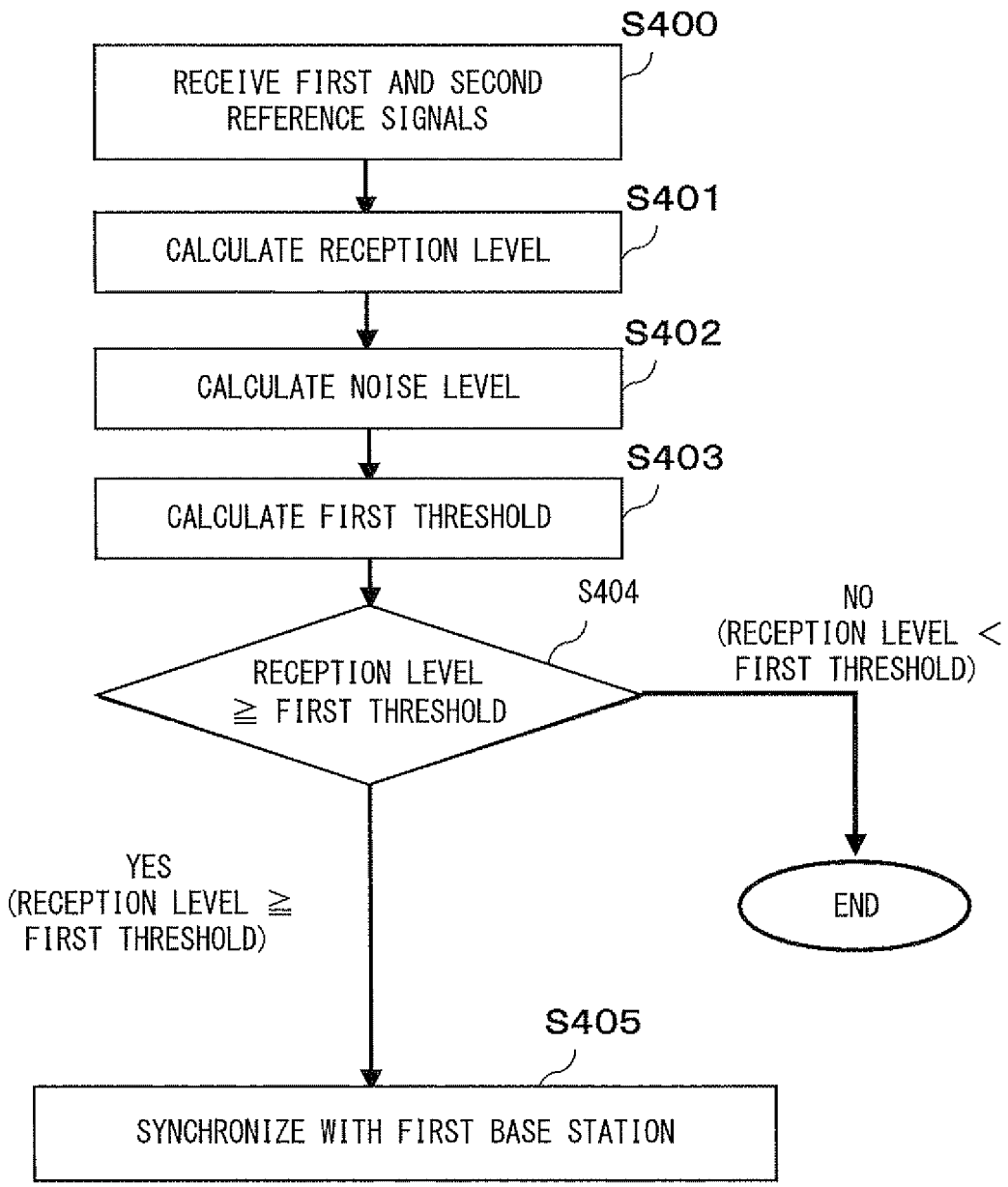
FIG. 14 is a flowchart of operations performed by the base station according to the fourth exemplary embodiment.

Next, an operation performed by the base station 400 according to this exemplary embodiment is explained with reference to FIG. 14.

A step S400 is similar to the step S100 in the first exemplary embodiment.

In a step S401, the reception level combination unit 40 calculates a reception level P based on a first reference signal that the communication unit 10 receives from the first base station 101 and a second reference signal that the communication unit 10 receives from the communication device 102.

In a step S402, the noise level combination unit 50 calculates a noise level $\sigma^2$ based on the first reference signal that the communication unit 10 receives from the first base station 101 and the second reference signal that the communication unit 10 receives from the communication device 102.

In a step S403, the calculation unit 60 calculates a first threshold $thr_{det}$ based on the noise level $\sigma^2$ calculated by the noise level combination unit 50 by using Expression 3.

In a step S404, the first determination unit 31 determines whether or not the base station 400 should synchronize with the first base station 101 based on whether or not the reception level P calculated by the reception level combination unit 40 is larger than the first threshold $thr_{det}$ calculated by the calculation unit 60.

When the determination result in the step S404 indicates that "the reception level P is smaller than the first threshold $thr_{det}$", i.e., "the reception level P<the first threshold $thr_{det}$" (step S404: No), the operation is finished.

On the other hand, when the determination result in the step S404 indicates that "the reception level P is larger than the first threshold $thr_{det}$", i.e., "the reception level P≥the first threshold $thr_{det}$" (step S404: Yes), the process moves to a step S405.

In the step S405, the execution unit 28 obtains synchronization with the first base station 101 based on the determination result of the first determination unit 31 in the step S404.

Through the above-described processes, the base station 400 according to this exemplary embodiment determines whether or not the base station 400 should synchronize with the first base station 101 based on the first reference signal transmitted from the first base station 101 and the second reference signal transmitted from the communication device 102, and synchronizes with the first base station 101 based on the determination result. Therefore, the base station 400 according to this exemplary embodiment can determine whether or not the base station 400 should synchronize with the first base station 101 more accurately.

<Fifth Exemplary Embodiment>

In this exemplary embodiment, a modified example of the above-described first to fourth exemplary embodiments is explained.

Figure 15:
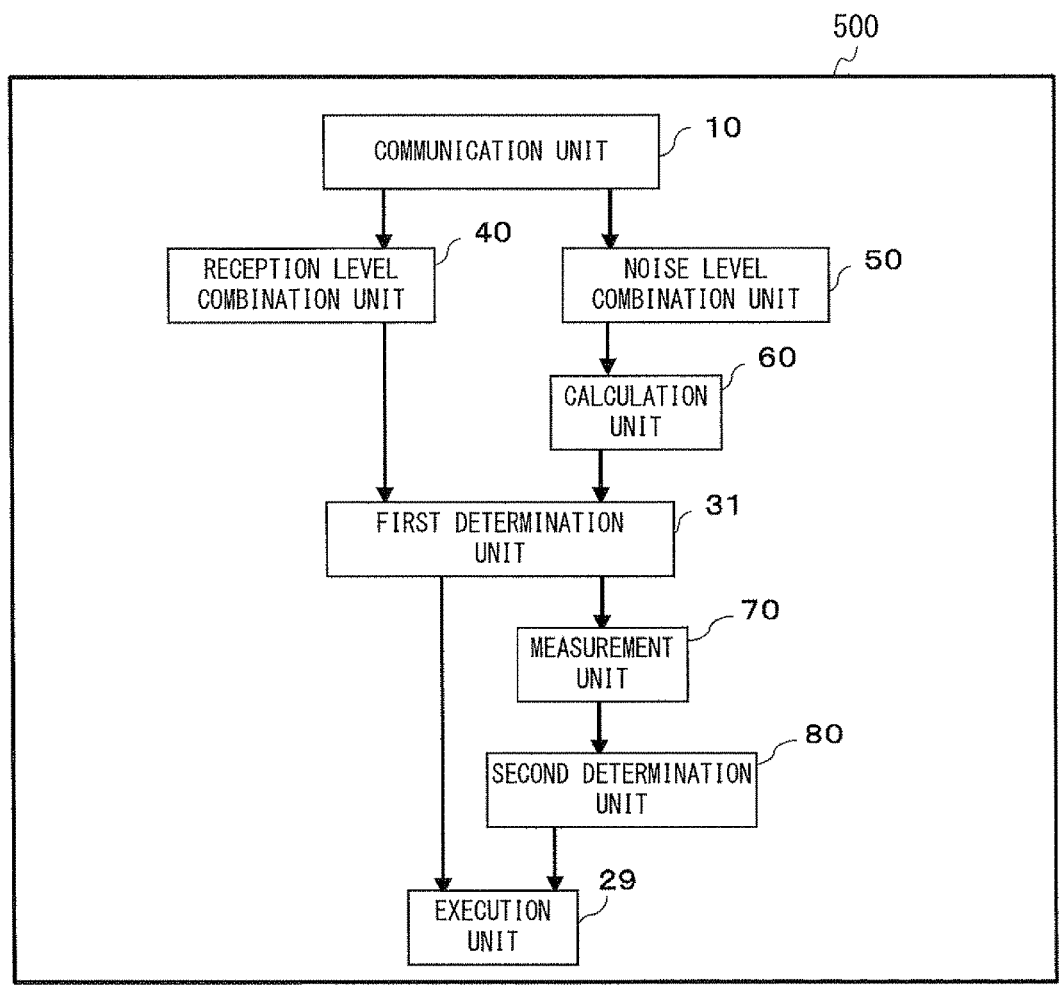
FIG. 15 is a block diagram of a base station according to a fifth exemplary embodiment.

FIG. 15 shows an example of a configuration of a base station 500 according to a fifth exemplary embodiment.

The base station 500 includes at least a communication unit 10, an execution unit 29, a first determination unit 31, a reception level combination unit 40, a noise level combination unit 50, a calculation unit 60, a measurement unit 70, and a second determination unit 80. The communication unit 10, the first determination unit 31, the reception level combination unit 40, the noise level combination unit 50, and the calculation unit 60 perform operations similar to those in the fourth exemplary embodiment.

The measurement unit 70 measures a period (i.e., the length of a period) during which the base station 500 has not synchronized with the first base station 101. The measurement unit 70 may measure the period during which the base station 500 has not synchronized with the first base station 101 by using a timer or by counting the number of times (or the number of occasions) in which the base station 500 did not synchronize with the first base station 101.

The second determination unit 80 determines whether or not the measurement result of the measurement unit 70 exceeds a second threshold.

Figure 16:
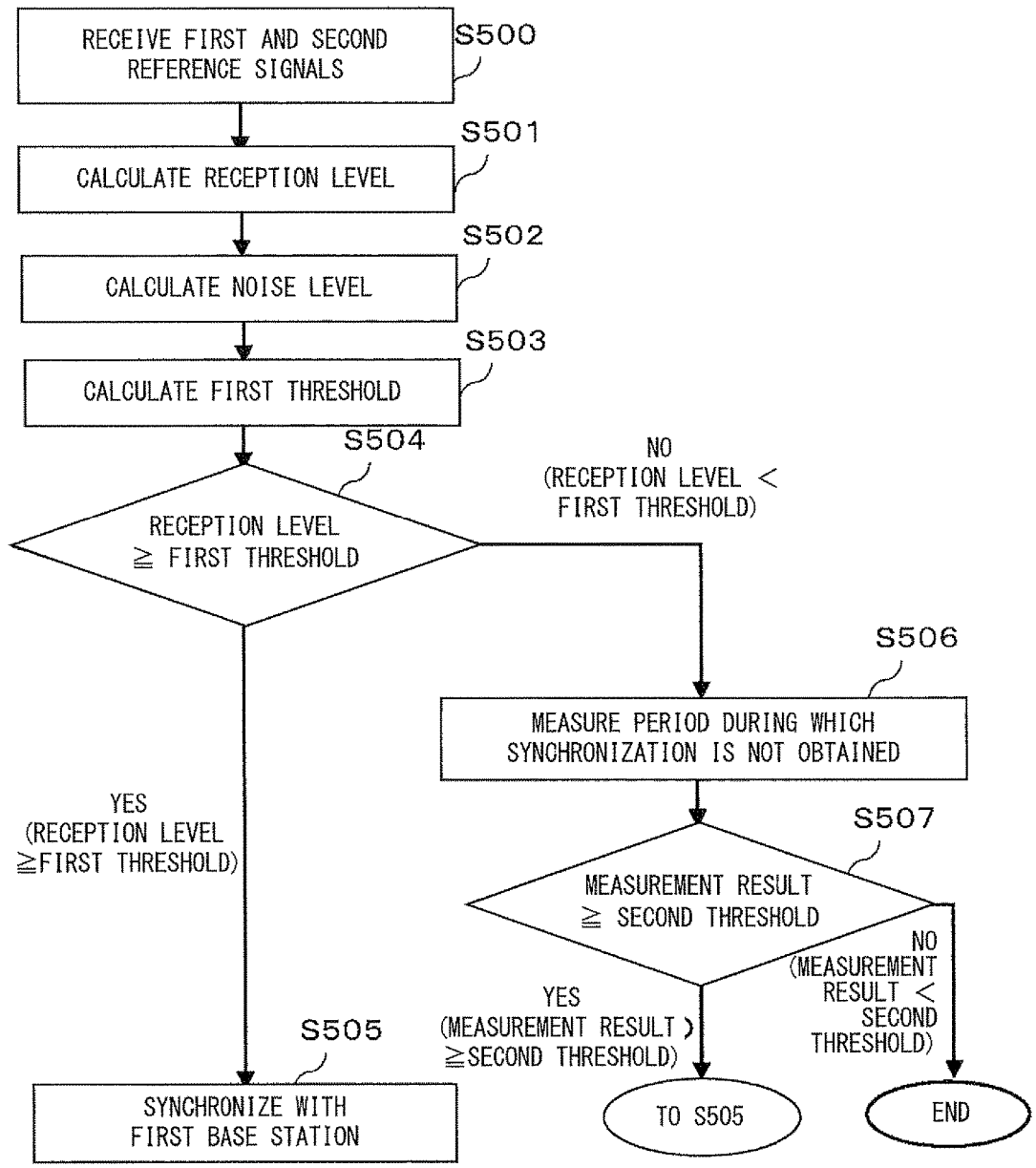
FIG. 16 is a flowchart of operations performed by the base station according to the fifth exemplary embodiment.

Next, an operation performed by the base station 500 according to this exemplary embodiment is explained with reference to FIG. 16.

Operations in steps S500-S503 and S505 are similar to those in the steps S400-S403 and S405, respectively, in the fourth exemplary embodiment.

In a step S504, the first determination unit 31 determines whether or not the base station 500 should synchronize with the first base station 101 based on whether or not the reception level P calculated by the reception level combination unit 40 is larger than the first threshold $thr_{det}$ calculated by the calculation unit 60.

When the determination result in the step S504 indicates that "the reception level P is smaller than the first threshold $thr_{det}$", i.e., "the reception level P<the first threshold $thr_{det}$" (step S504: No), the process moves to a step S506.

In the step S506, the measurement unit 70 measures a period during which the base station 500 has not synchronized with the first base station 101.

In a step S507, the second determination unit 80 determines whether or not the measurement result of the measurement unit 70 exceeds a second threshold.

When the determination result in the step S507 indicates that "the measurement result does not exceed the second threshold", i.e., "the measurement result<the second threshold" (step S507: No), the operation is finished.

On the other hand, when the determination result in the step S507 indicates that "the measurement result exceeds the second threshold", i.e., "the measurement result≥the second threshold" (step S507: Yes), the process moves to the step S505.

Through the above-described processes, the base station 500 according to this exemplary embodiment synchronizes with the first base station 101 based not only on the determination result of the first determination unit 31, but also on the determination result of the second determination unit 80. Consequently, the base station 500 according to this modified example can solve the following problem. For example, in a determination whether or not a base station should synchronize with another base station 101, when the determination result indicating that "the synchronization should not be obtained", the base station cannot synchronize with the other base station. In the above-described determination, when determination results indicating that "the synchronization should not be obtained" successively occur, the period during which the base station cannot synchronize with the other base station becomes longer. As the state in which the base station cannot synchronize with the other base station continues, a problem such as an occurrence of interference between subframes could occur.

To cope with the above-described problem, the base station 500 according to this exemplary embodiment determines that the base station 500 should synchronize with the first base station 101 when the period during which the base station 500 has not synchronized with the first base station 101 reaches a specific period or longer, and synchronizes with the first base station 101. Therefore, it is possible to prevent the problem that would otherwise occur when the state in which the base station 500 does not synchronize with the first base station 101 continues.

<Sixth Exemplary Embodiment>

In this exemplary embodiment, a modified example of the above-described first to fifth exemplary embodiments is explained.

Figure 17:
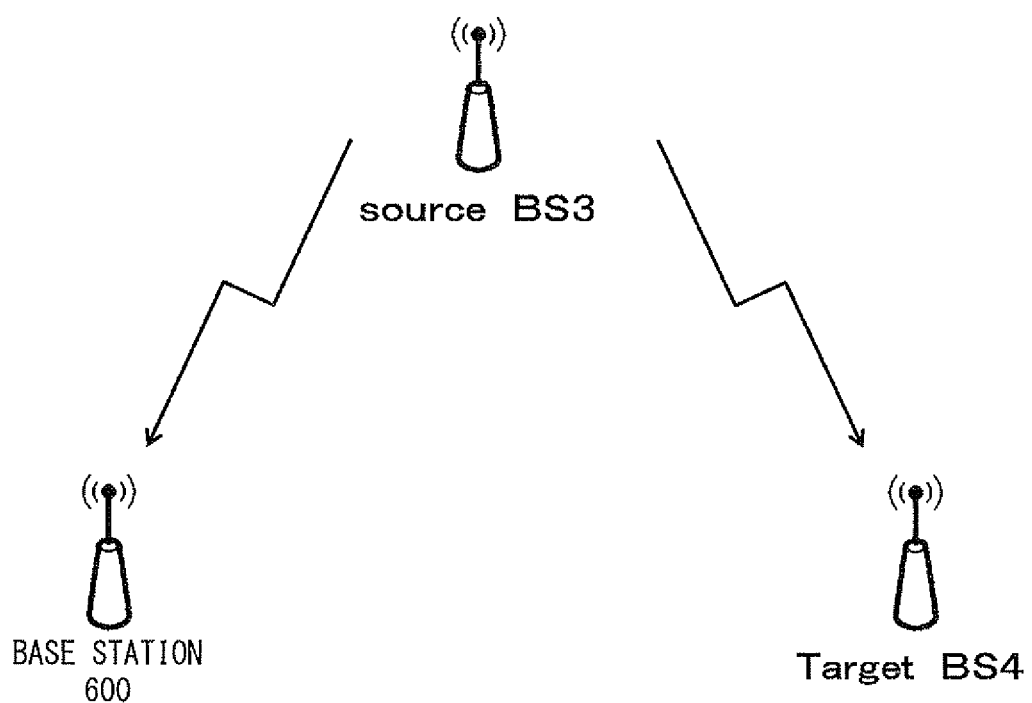
FIG. 17 is a block diagram of a communication system according to a sixth exemplary embodiment.

FIG. 17 shows a configuration example of a communication system according to a sixth exemplary embodiment. Referring to FIG. 17, the communication system includes a Source BS (Source Base Station) 3, a Target BS (Target Base Station) 4, and a base station 600 (an own station). The base station 600 reciprocally communicates with the Source BS 3 and the Target BS 4.

It should be noted that the Source BS 3 is a base station based on which synchronization is obtained and the Target BS 4 is a base station which is synchronized with the Source BS 3.

The Source BS 3 corresponds to the first base station 101 in the first to fifth exemplary embodiments. The Source BS 3 includes independent synchronization means such as a GPS and hence can obtain accurate synchronization. Further, the Source BS 3 transmits a first reference signal to the Target BS 4 and the base station 600.

The Target BS 4 corresponds to the communication device 102 in the first to fifth exemplary embodiments. The Target BS 4 does not include any independent synchronization means such as a GPS and attempts to synchronize with the Source BS 3 while using the Source BS 3 as an entity based on which the Source BS 3 is synchronized. Further, the Target BS 4 generates a second reference signal for the base station 600 and transmits the generated second reference signal to the base station 600.

Figure 18:
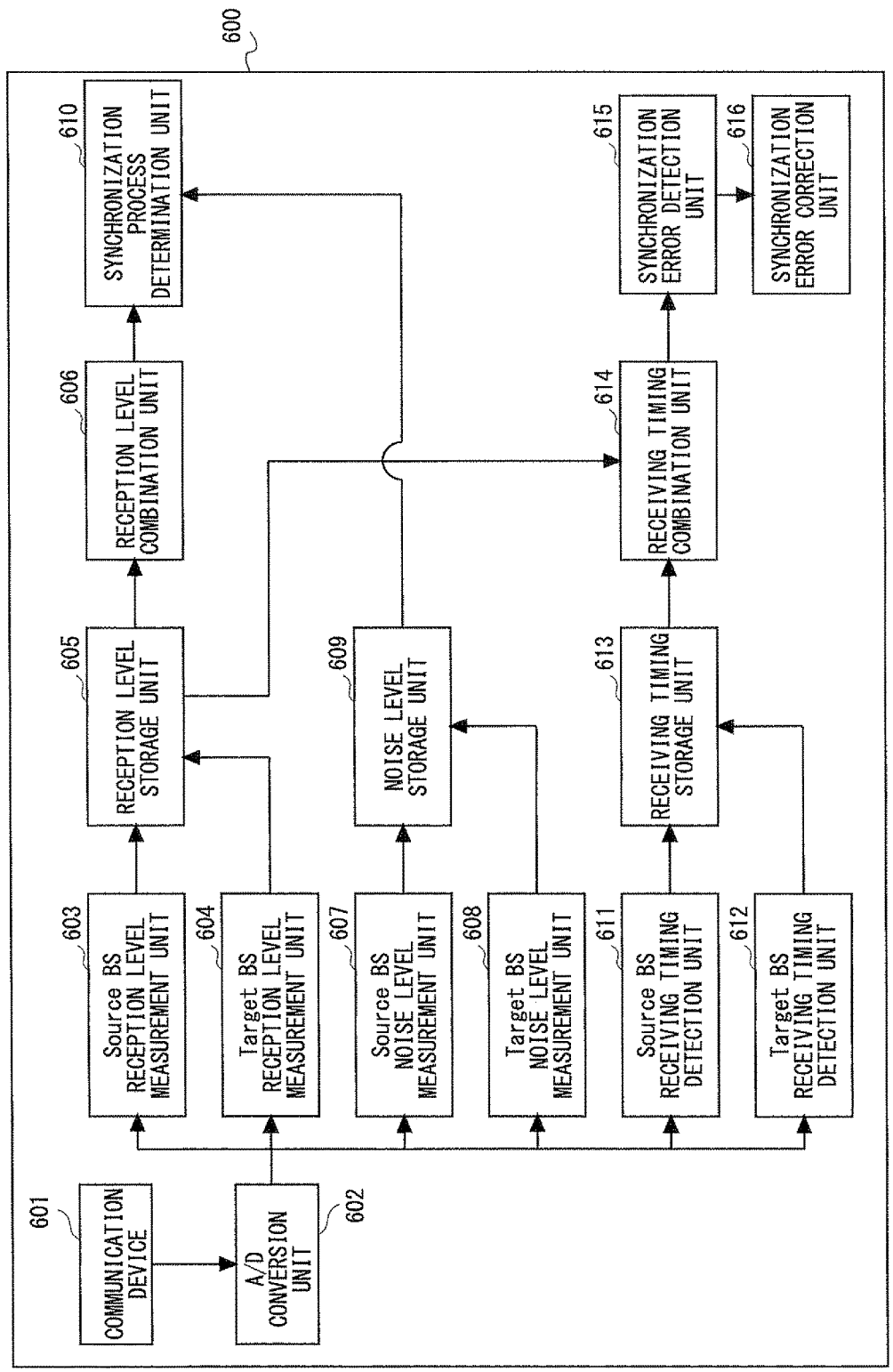
FIG. 18 is a block diagram of a base station according to the sixth exemplary embodiment.

FIG. 18 shows an example of a configuration of the base station 600 according to the sixth exemplary embodiment.

The base station 600 includes at least a communication unit 601, an A/D conversion unit 602, a Source BS reception level measurement unit 603, a Target BS reception level measurement unit 604, a reception level storage unit 605, a reception level combination unit 606, a Source BS noise level measurement unit 607, a Target BS noise level measurement unit 608, a noise level combination unit 609, a synchronization process determination unit 610, a Source BS receiving timing detection unit 611, a Target BS receiving timing detection unit 612, a receiving timing storage unit 613, a receiving timing combination unit 614, a synchronization error detection unit 615, and a synchronization error correction unit 616.

The communication unit 601 performs operations similar to those of the communication unit 10 according to the first to fifth exemplary embodiments.

The A/D conversion unit 602 converts first and second analog reference signals received by the communication unit 601 into digital signals and thereby generates first and second digital reception reference signals, respectively. It should be noted that the first and second reference signals may be input to the A/D conversion unit as reception reference signals that have been affected by various factors such as the propagation path and noises.

The A/D conversion unit 602 outputs the first digital reception reference signal to the Source BS reception level measurement unit 603, the Source BS noise level measurement unit 607, and the Source BS receiving timing detection unit 611. The A/D conversion unit 602 outputs the second digital reception reference signal to the Target BS reception level measurement unit 604, the Target BS noise level measurement unit 608, and the Target BS receiving timing detection unit 612.

The Source BS reception level measurement unit 603 corresponds to the first reception level measurement unit 24 in the modified example of the second exemplary embodiment. The Source BS reception level measurement unit 603 measures a first reception level $P_{source}$ related to the first digital reception reference signal by using the first digital reception reference signal and information about a reference signal of the Source BS 3 that is notified (i.e., sent) through backhaul in advance. The Source BS reception level measurement unit 603 outputs the measured first reception level $P_{source}$ to the reception level storage unit 605.

The Target BS reception level measurement unit 604 corresponds to the second reception level measurement unit 25 in the modified example of the second exemplary embodiment. The Target BS reception level measurement unit 604 measures a second reception level $P_{target}$ related to the second digital reception reference signal by using the second digital reception reference signal and information about a reference signal of the Target BS 4 that is notified (i.e., sent) through backhaul in advance. The Target BS reception level measurement unit 604 outputs the measured second reception level $P_{target}$ to the reception level storage unit 605.

The reception level storage unit 605 corresponds to the reception level storage unit 26 in the modified example of the second exemplary embodiment. The reception level storage unit 605 stores (i.e., retains) the first reception level $P_{source}$ and the second reception level $P_{target}$ for a specific period. Therefore, the reception level storage unit 605 stores the latest first reception level $P_{source}$ (N), the latest second reception level $P_{target}$ (N), a first reception level $P_{source}$ (i) in the past, and a second reception level $P_{target}$ (i) in the past.

The reception level storage unit 605 outputs the stored latest first reception level $P_{source}$ (N) and the latest second reception level $P_{target}$ (N) to the reception level combination unit 606. Further, the reception level storage unit 605 outputs the stored latest first reception level $P_{source}$ (N), the past first reception level $P_{source}$ (i), the latest second reception level $P_{target}$ (N), and the past second reception level $P_{target}$ (i) to the receiving timing combination unit 614.

The reception level combination unit 606 calculates a reception level P based on the latest first reception level $P_{source}$ (N) and the latest second reception level $P_{target}$ (N) by using Expression 4.

$$P = \frac{w_{p\_source} \cdot P_{source} + w_{p\_target} \cdot P_{target}}{w_{p\_source} + w_{p\_target}} \quad \text{(Expression 4)}$$

In the expression, $W_{p\_source}$ and $W_{p\_target}$ are weighting coefficients related to the first reception level $P_{source}$ and the second reception level $P_{target}$, respectively, and can be set as parameters. The reception level combination unit 606 outputs the calculated reception level P to the synchronization process determination unit 610.

The Source BS noise level measurement unit 607 measures a first noise level $\sigma^2_{source}$ by using the first digital reception reference signal and information about the reference signal of the Source BS 3 that is notified (i.e., sent) through backhaul in advance. The Source BS noise level measurement unit 607 outputs the measured first noise level $\sigma^2_{source}$ to the noise level combination unit 609.

The Target BS noise level measurement unit 608 measures a second noise level $\sigma^2_{target}$ by using the second digital reception reference signal and information about the reference signal of the Target BS 4 that is notified (i.e., sent) through backhaul in advance. The Target BS noise level measurement unit 608 outputs the measured second noise level $\sigma^2_{target}$ to the noise level combination unit 609.

The noise level combination unit 609 calculates a noise level $\sigma^2$ by using the first noise level $\sigma^2_{source}$ and the second noise level $\sigma^2_{target}$. The noise level combination unit 609 outputs the calculated noise level $\sigma^2$ to the synchronization process determination unit 610.

The synchronization process determination unit 610 corresponds to the first determination unit 31 and the calculation unit 60 in the fourth exemplary embodiment. The synchronization process determination unit 610 calculates a first threshold $thr_{det}$ based on the noise level $\sigma^2$ calculated by the noise level combination unit 609 by using Expression 3.

Further, the synchronization process determination unit 610 determines whether or not the base station 600 should synchronize with the Source BS 3 based on whether or not the reception level P calculated by the reception level combination unit 605 is larger than the first threshold $thr_{det}$.

Further, the synchronization process determination unit 610 corresponds to the measurement unit 70 and the second determination unit 80 in the fourth exemplary embodiment. When the synchronization process determination unit 610 determines that "the base station 600 should not synchronize with the Source BS 3", the synchronization process determination unit 610 updates a synchronization non-performance counter $c_{non\_sync}$ (n) (note that n indicates the number of times (or the number of occasions) in which the synchronization process determination unit 610 determines that "the base station 600 should not synchronize with the Source BS 3"). Specifically, the synchronization process determination unit 610 updates the value of the synchronization non-performance counter $c_{non\_sync}$ (n) according to a calculating formula "$c_{non\_sync}(n)=c_{non\_sync}(n-1)+1$".

Further, the synchronization process determination unit 610 compares the synchronization non-performance counter $c_{non\_sync}$ (n) with a maximum synchronization update period $T_{max\_sync}$. The maximum synchronization update period $T_{max\_sync}$ corresponds to the second threshold in the fifth exemplary embodiment and indicates an upper limit value for the number of times (or the number of occasions) in which it is determined that "the base station 600 should not synchronize with the Source BS 3". When the comparison result is "$c_{non\_sync}(n) \geq T_{max\_sync}$", the synchronization process determination unit 610 determines that synchronization between the base stations should be performed. On the other hand, when the comparison result is "$c_{non\_sync}(n) < T_{max\_sync}$", the synchronization process determination unit 610 determines that synchronization between the base stations should not be performed.

The Source BS receiving timing detection unit 611 corresponds to the first receiving timing detection unit 210 in the second exemplary embodiment. The Source BS receiving timing detection unit 611 measures a first receiving timing $t_{rx\_source}$ by using the first digital reception reference signal and information about the reference signal of the Source BS 3 that is notified (i.e., sent) through backhaul in advance. The Source BS receiving timing detection unit 611 outputs the first receiving timing $t_{rx\_source}$ to the receiving timing storage unit 613.

The Target BS receiving timing detection unit 612 corresponds to the second receiving timing detection unit 211 in the second exemplary embodiment. The Target BS receiving timing detection unit 612 measures a second receiving timing $t_{rx\_target}$ by using the second digital reception reference signal and information about the reference signal of the Target BS 4 that is notified (i.e., sent) through backhaul in advance. The Target BS receiving timing detection unit 612 outputs the second receiving timing $t_{rx\_target}$ to the receiving timing storage unit 613.

The receiving timing storage unit 613 corresponds to the receiving timing storage unit 220 in the modified example of the second exemplary embodiment. The receiving timing storage unit 613 stores (i.e., retains) the first receiving timing $t_{rx\_source}$ and the second receiving timing $t_{rx\_target}$ in a memory for a specific period. The receiving timing storage unit 613 outputs the stored latest first receiving timing $t_{rx\_source}(N)$, the latest second receiving timing $t_{rx\_target}(N)$, a first receiving timing $t_{rx\_source}(i)$ in the past, and a second receiving timing $t_{rx\_target}(i)$ in the past to the receiving timing combination unit 614.

The receiving timing combination unit 614 corresponds to the receiving timing combination unit 230 in the modified example of the second exemplary embodiment. The receiving timing combination unit 614 calculates a receiving timing $t_{rx}$ based on the latest first receiving timing $t_{rx\_source}(N)$ and the past first receiving timing $t_{rx\_source}(i)$, the latest second receiving timing $t_{rx\_target}(N)$ and the past second receiving timing $t_{rx\_target}(i)$, the latest first reception level $P_{1st}(N)$ and the past first reception level $P_{1st}(i)$, and the latest second reception level $P_{2nd}(N)$ and the past second reception level $P_{2nd}(i)$ by using Expression 5.

$$t_{rx} = \frac{\frac{W_{t\_source}}{N_{fr}} \sum_{i=0}^{N_{fr}-1} P_{source}(i) \cdot t_{rx\_source}(i) + \frac{W_{t\_target}}{N_{fr}} \sum_{i=0}^{N_{fr}-1} P_{target}(i) \cdot t_{rx\_target}(i)}{\frac{W_{t\_source}}{N_{fr}} \sum_{i=0}^{N_{fr}-1} P_{source}(i) + \frac{W_{t\_target}}{N_{fr}} \sum_{i=0}^{N_{fr}-1} P_{target}(i)}$$ (Expression 5)

In the expression, $w_{t\_source}$ and $w_{t\_target}$ are weighting coefficients related to the first and second receiving timings, respectively, and can be set as parameters. Further, i represents a subframe number and $N_{fr}$ represents the number of subframes with which a reference signal is received.

The synchronization error detection unit 615 corresponds to the synchronization error detection unit 213 in the second exemplary embodiment.

The synchronization error correction unit 616 corresponds to the synchronization error correction unit 214 in the second exemplary embodiment.

Figure 19:
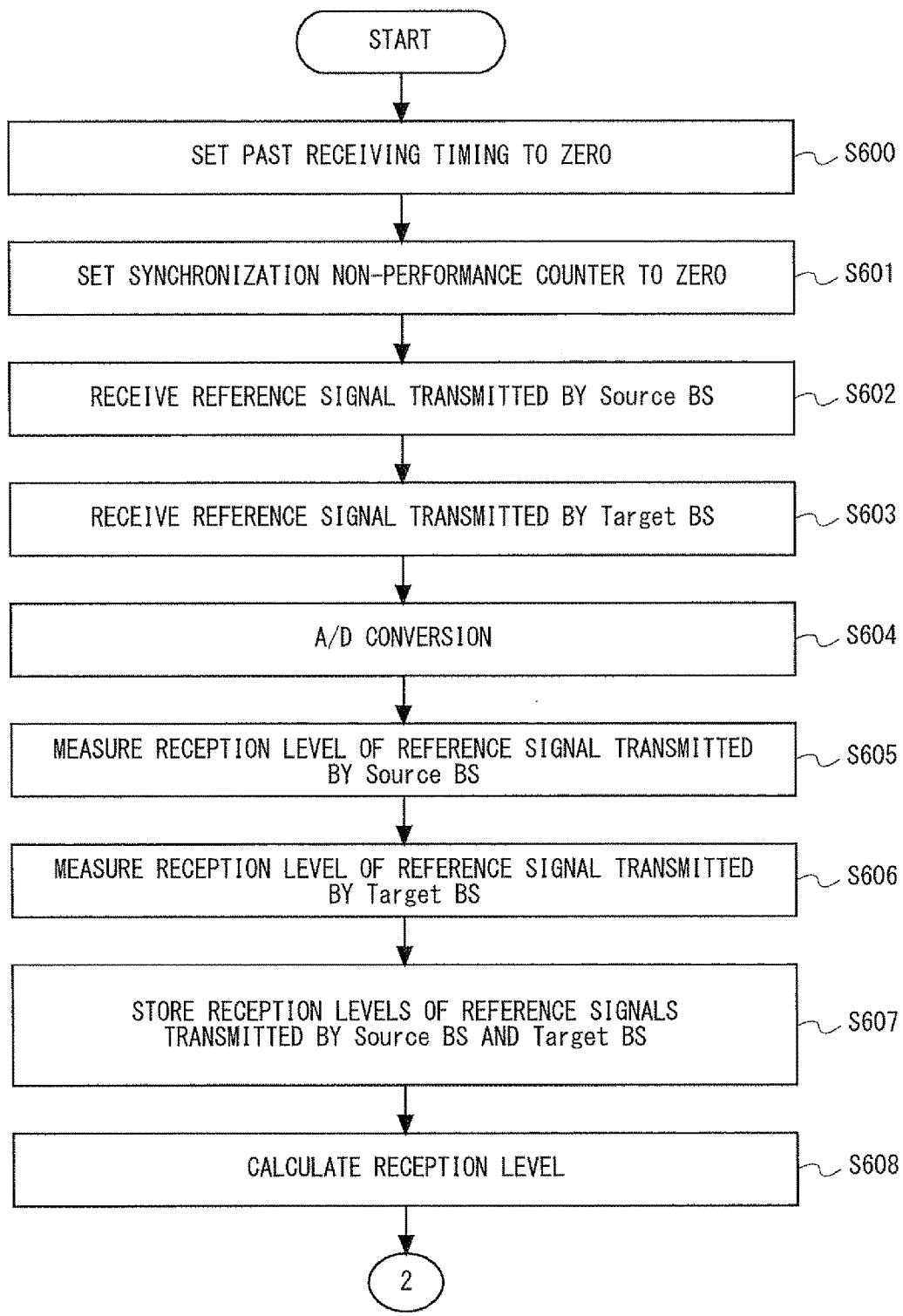
FIG. 19 is a flowchart of operations performed by the base station according to the sixth exemplary embodiment.
Figure 20:
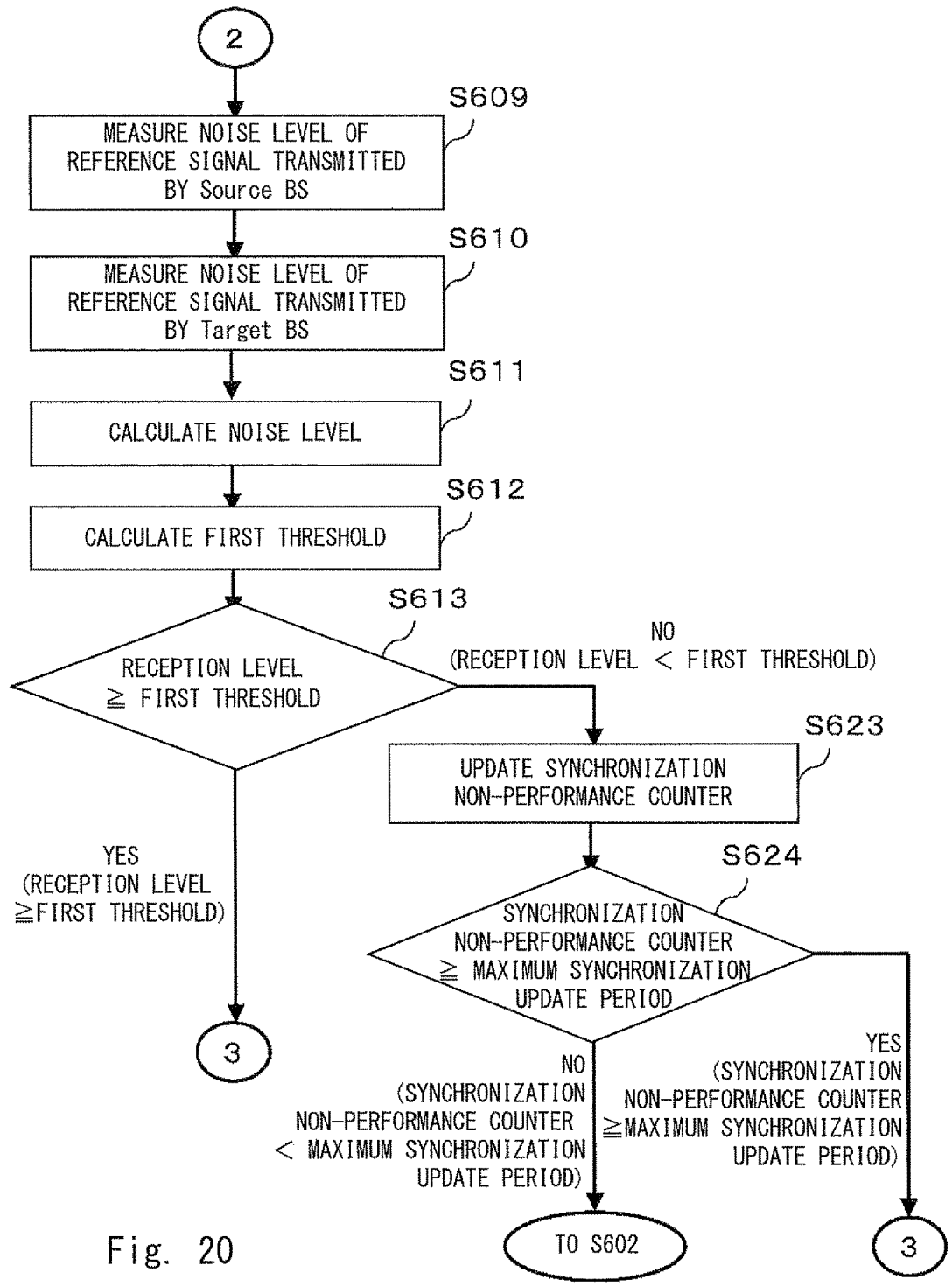
FIG. 20 is a flowchart of operations performed by the base station according to the sixth exemplary embodiment.
Figure 21:
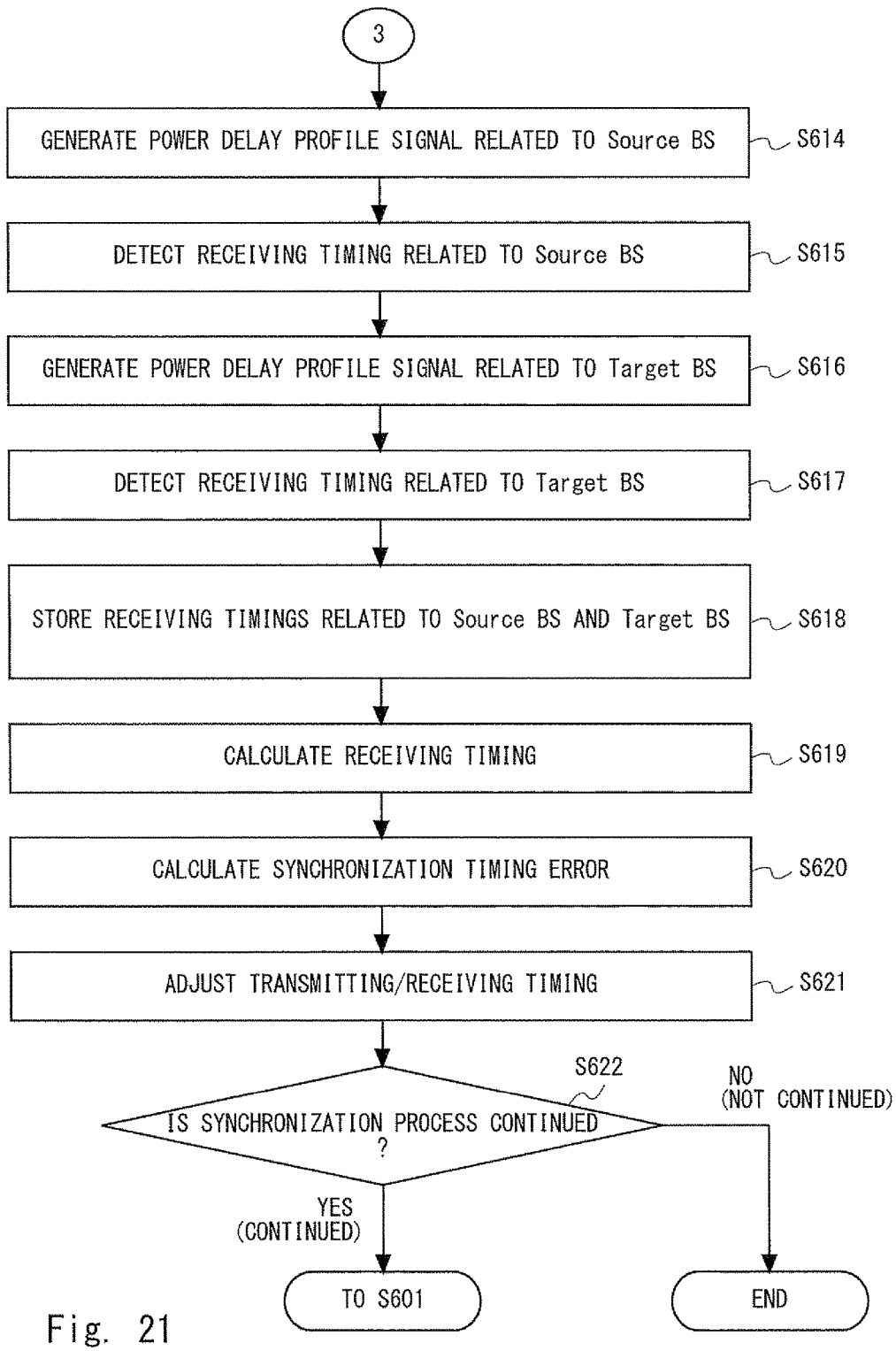
FIG. 21 is a flowchart of operations performed by the base station according to the sixth exemplary embodiment.

Next, an operation performed by the base station 600 according to this exemplary embodiment is explained with reference to FIGS. 19 to 21.

In a step S600, the past receiving timing $t_{rx\_pre}$ is set to zero ($t_{rx\_pre}=0$).

In a step S601, the synchronization non-performance counter $c_{non\_sync}(n)$ is set to zero ($c_{non\_sync}(n)=0$).

In a step S602, the communication unit 601 receives a first reference signal transmitted from the Source BS 3.

In a step S603, the communication unit 601 receives a second reference signal transmitted from the Target BS 4.

In a step S604, the A/D conversion unit 602 converts the first and second analog reference signals received by the communication unit 601 into digital signals and thereby generates first and second digital reception reference signals, respectively.

In a step S605, the Source BS reception level measurement unit 603 measures a first reception level $P_{source}$ related to the first digital reception reference signal by using the first digital reception reference signal and information about the reference signal of the Source BS 3 that is notified (i.e., sent) through backhaul in advance.

In a step S606, the Target BS reception level measurement unit 604 measures a second reception level $P_{target}$ related to the second digital reception reference signal by using the second digital reception reference signal and information about the reference signal of the Target BS 4 that is notified (i.e., sent) through backhaul in advance.

In a step S607, the reception level storage unit 605 stores (i.e., retains) the first reception level $P_{source}$ measured by the Source BS reception level measurement unit 603 and the second reception level $P_{target}$ measured by the Target BS reception level measurement unit 604 for a specific period.

In a step S608, the reception level combination unit 606 calculates a reception level P based on the latest first reception level $P_{source}(N)$ and the latest second reception level $P_{target}(N)$ by using Expression 4.

In a step S609, the Source BS noise level measurement unit 607 measures a first noise level $\sigma^2_{source}$ by using the first digital reception reference signal and information about the reference signal of the Source BS 3 that is notified (i.e., sent) through backhaul in advance.

In a step S610, the Target BS noise level measurement unit 608 measures a second noise level $\sigma^2_{target}$ by using the second digital reception reference signal and information about the reference signal of the Target BS 4 that is notified (i.e., sent) through backhaul in advance.

In a step S611, the noise level combination unit 609 calculates a noise level $\sigma^2$ by using the first noise level $\sigma^2_{source}$ and the second noise level $\sigma^2_{target}$.

In a step S612, the synchronization process determination unit 610 calculates a first threshold $thr_{det}$ based on the noise level $\sigma^2$ calculated by the noise level combination unit 609 by using Expression 3.

In a step S613, the synchronization process determination unit 610 determines whether or not the base station 600 should synchronize with the Source BS 3 based on whether or not the reception level P calculated by the reception level combination unit 605 is larger than the first threshold $thr_{det}$.

When the determination result in the step S613 indicates that "the reception level P is smaller than the first threshold $thr_{det}$", i.e., "the reception level P<the first threshold $thr_{det}$" (step S613: No), the process moves to a step S623.

On the other hand, when the determination result in the step S613 indicates that "the reception level P is larger than the first threshold $thr_{det}$", i.e., "the reception level P≥ the first threshold $thr_{det}$" (step S613: Yes), the process moves to the step S614.

In the step S614, the Source BS receiving timing detection unit 611 generates a power delay profile signal related to the Source BS 3 by using the first digital reception reference signal and information about the reference signal of the Source BS 3 that is notified (i.e., sent) through backhaul in advance.

In a step S615, the Source BS receiving timing detection unit 611 detects a timing at which a peak occurs in the power delay profile signal as a first receiving timing $t_{rx\_source}$.

In a step S616, the Target BS receiving timing detection unit 612 generates a power delay profile signal related to the Target BS 4 by using the second digital reception reference signal and information about the reference signal of the Target BS 4 that is notified (i.e., sent) through backhaul in advance.

In a step S617, the Target BS receiving timing detection unit 612 detects a timing at which a peak occurs in the power delay profile signal as a second receiving timing $t_{rx\_target}$.

In a step S618, the receiving timing storage unit 613 stores (i.e., retains) the first receiving timing $t_{rx\_source}$ and the second receiving timing $t_{rx\_target}$ in a memory for a specific period.

In a step S619, the receiving timing combination unit 614 calculates a receiving timing $t_{rx}$ based on the latest first receiving timing $t_{rx\_source}$ (N) and the past first receiving timing $t_{rx\_source}$ (i), the latest second receiving timing $t_{rx\_target}$ (N) and the past second receiving timing $t_{rx\_target}$ (i), the latest first reception level $P_{1st}$ (N) and the past first reception level $P_{1st}$ (i), and the latest second reception level $P_{2nd}$ (N) and the past second reception level $P_{2nd}$ (i) by using Expression 5.

A step S620 corresponds to the step S225 in the modified example of the second exemplary embodiment.

A step S621 corresponds to the step S205 in the second exemplary embodiment.

In a step S622, it is determined whether or not the synchronization process should be continued. Note that the synchronization process means performing various processes for obtaining synchronization with the Source BS 3 (i.e., the processes in the step S601 and the subsequent steps). When the determination result in the step S622 indicates that "the synchronization process should not be continued" (step S622: No), the operation is finished. On the other hand, when the determination result in the step S622 indicates that "the synchronization process should be continued" (step S622: Yes), the process returns to the step S602.

In a step S623, the synchronization process determination unit 610 counts up (i.e., increments) the synchronization non-performance counter $c_{non\_sync}$ (n). Specifically, the synchronization process determination unit 610 updates the synchronization non-performance counter $c_{non\_sync}$ (n) according to a calculating formula "$c_{non\_sync}=c_{non\_sync}+1$".

In a step S624, the synchronization process determination unit 610 compares the synchronization non-performance counter $c_{non\_sync}$ (n) with the maximum synchronization update period $T_{max\_sync}$. When the comparison result is "$c_{no\_nsync}(n) \geq T_{max\_sync}$", the synchronization process determination unit 610 determines that synchronization between the base stations should be obtained. Therefore, the process moves to the step S614. On the other hand, when the comparison result is "$c_{non\_sync}(n) < T_{max\_sync}$", the synchronization process determination unit 610 determines that synchronization between the base stations should not be obtained. Therefore, the process returns to the step S602.

Through the above-described processes, the base station 600 according to this exemplary embodiment determines whether or not the base station 600 should synchronize with the Source BS 3 based on the first reference signal transmitted from the Source BS 3 and the second reference signal transmitted from the Target BS 4, and synchronizes with the Source BS 3 based on the determination result. Therefore, the base station 600 according to this exemplary embodiment can determine whether or not the base station 600 should synchronize with the Source BS 3 more accurately.

Further, the base station 600 according to this exemplary embodiment synchronizes with the Source BS 3 based on the first reference signal transmitted from the Source BS 3 and the second reference signal transmitted from the Target BS 4. Therefore, the base station 600 according to this exemplary embodiment can improve the accuracy of the synchronization between the base station 600 and the Source BS 3 even when the propagation path condition between the base station 600 and the Source BS 3 is poor or when noises are large.

Further, the base station 600 according to this exemplary embodiment determines that the base station 600 should synchronize with the Source BS 3 when the period during which the base station 600 has not synchronized with the Source BS 3 reaches a specific period or longer, and synchronizes with the Source BS 3. Therefore, it is possible to prevent the problem that would otherwise occur when the state in which the base station 600 does not synchronize with the Source BS 3 continues.

Each of the processes in the above-described exemplary embodiments may be performed by software. That is, a computer program for performing each of the processes may be read into a CPU (Central Processing Unit) included in a communication device and performed by the CPU. Even when each of the processes is performed by using the computer program, processes substantially the same as those in the above-described exemplary embodiments can be performed. Further, the aforementioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 22:
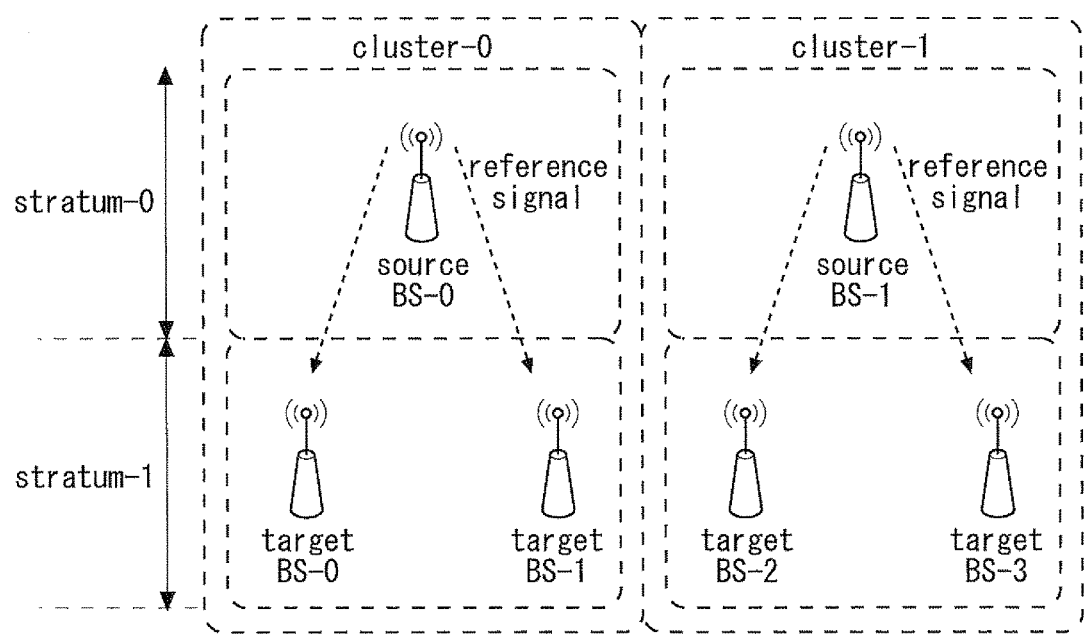
FIG. 22 is a block diagram of a communication system according to first to sixth exemplary embodiments.
Figure 23A:
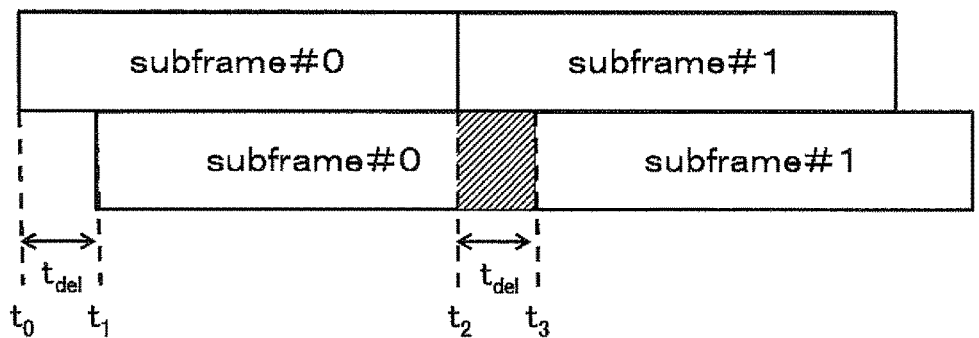
FIG. 23A is a conceptual diagram showing a process in which a receiver receives data at a plurality of receiving timings.
Figure 23B:
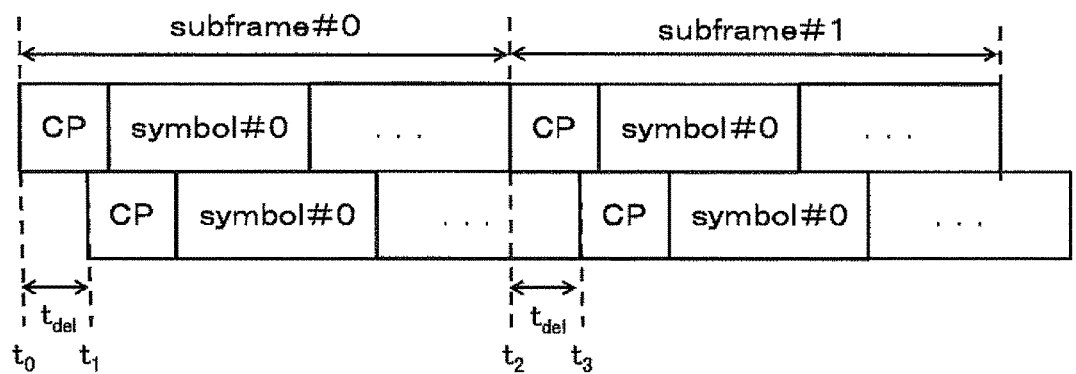
FIG. 23B is a conceptual diagram showing a process in which a receiver receives data at a plurality of receiving timings.
Figure 24:
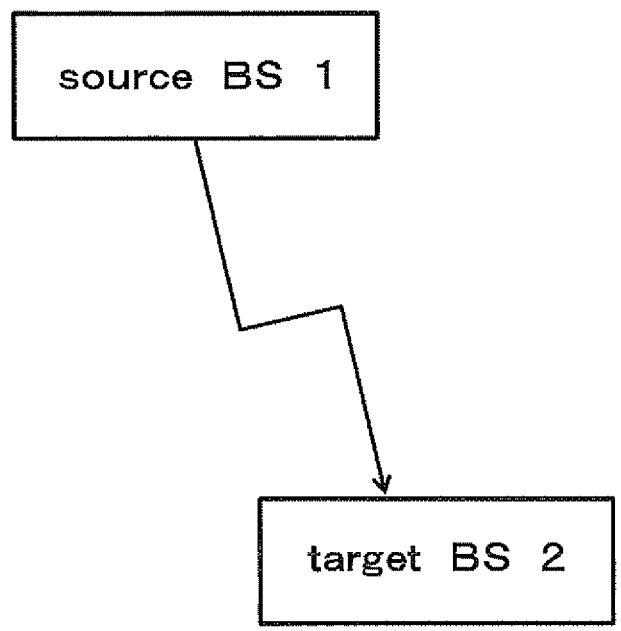
FIG. 24 shows an ordinary network configuration in network listening.

Each of the processes in the above-described exemplary embodiments may be carried out in a communication system shown in FIG. 22. Referring to FIG. 22, this communication system includes a Source BS 3, a Target BS 4, a base station 600, a Source BS 5, a Target BS 6, and a Target BS 7.

The Source BS 3, the Target BS 4, and the base station 600 constitute a cluster-0. Similarly, the Source BS 5, the Target BS 6, and the Target BS 7 constitute a cluster-1. Note that each of the Target BSs may obtain synchronization by using a reference signal transmitted from a Source BS included in the same cluster. Alternatively, each of the Target BSs may obtain synchronization by using a reference signal transmitted from a Source BS included in a different cluster.

Further, each of the Source BS 3 and the Source BS 5 constitutes a stratum-0. Similarly, the Target BS 4 and the base station 600 constitute a stratum-1. The Target BS 6 and the Target BS 7 also constitute a stratum-1. Although FIG. 22 shows a configuration including the stratum-0 and the stratum-1, it may include a stratum-2 and subsequent stratums. Further, each of the stratums may include a device other than the Source BS and the Target BS shown in FIG. 22.

Although the present invention is explained above with reference to exemplary embodiments, the present invention is not limited to the above-described exemplary embodiments. Various modifications that can be understood by those skilled in the art can be made to the configuration and details of the present invention within the scope of the invention. For example, the whole or part of the exemplary embodiments disclosed above can be described as, but not limited to, the following supplementary notes.

(Supplementary note 1)

A base station comprising:

a communication unit configured to receive a first reference signal transmitted from a first base station and a second reference signal transmitted from a communication device different from the first base station; and an execution unit configured to obtain synchronization between the base station and the first base station based on the first and second reference signals.

(Supplementary Note 2)

The base station described in Supplementary note 1, further comprising a first determination unit configured to determine whether or not the base station should synchronize with the first base station based on the first and second reference signals, wherein the execution unit obtains synchronization with the first base station based on a determination result of the first determination unit.

(Supplementary Note 3)

The base station described in Supplementary note 1 or 2, wherein the first determination unit determines whether or not the base station should synchronize with the first base station based on a reception level calculated based on the first and second reference signals and a noise level calculated based on the first and second reference signals.

(Supplementary Note 4)

The base station described in Supplementary note 3, further comprising:

a reception level combination unit configured to calculate the reception level based on a first reception level of the first reference signal and a second reception level of the second reference signal;

a noise level combination unit configured to calculate the noise level based on a first noise level of the first reference signal and a second noise level of the second reference signal; and a calculation unit configured to calculate a first threshold by using the noise level, wherein the first determination unit determines whether or not the base station should synchronize with the first base station based on the reception level and the first threshold.

(Supplementary Note 5)

The base station described in any one of Supplementary notes 2 to 4, further comprising a second determination unit configured to, when the determination result of the first determination unit indicates that the base station should not synchronize with the first base station, determine whether or not the base station should synchronize with the first base station based on a period during which the base station has not synchronized with the first base station, wherein the execution unit obtains synchronization with the first base station based on a determination result of the second determination unit.

(Supplementary Note 6)

The base station described in Supplementary note 5, further comprising a measurement unit configured to measure the period during which the base station has not synchronized with the first base station, wherein the second determination unit determines that the base station should synchronize with the first base station when a measurement result of the measurement unit meets a second threshold, and the execution unit obtains synchronization with the first base station based on the determination result of the second determination unit.

(Supplementary Note 7)

The base station described in any one of Supplementary notes 1 to 6, wherein the first base station is a base station configured to implement a network listening function and is a Source Base Station having a GPS function.

(Supplementary Note 8)

The base station described in any one of Supplementary notes 1 to 7, wherein the communication device is a base station configured to implement a network listening function and is a Target Base Station having no GPS function.

(Supplementary note 9)

A communication system comprising a first base station, a communication device different from the first base station, and a base station, wherein the first base station transmits a first reference signal to the base station, the communication device transmits a second reference signal to the communication device, and the base station comprises:

a communication unit configured to receive the first and second reference signals; and an execution unit configured to obtain synchronization between the base station and the first base station based on the first and second reference signals.

(Supplementary note 10)

A method comprising:

a step of receiving a first reference signal transmitted from a first base station and a second reference signal transmitted from a communication device different from the first base station; and a step of obtaining synchronization between the base station and the first base station based on the first and second reference signals.

(Supplementary note 11)

A program for causing a computer to execute:

a step of receiving a first reference signal transmitted from a first base station and a second reference signal transmitted from a communication device different from the first base station; and a step of obtaining synchronization between the base station and the first base station based on the first and second reference signals.

This application is based upon and claims the benefit of priority from Japanese patent application No. 2014-159684, filed on Aug. 5, 2014, the disclosure of which is incorporated herein in its entirety by reference.

REFERENCE SIGNS LIST

101 FIRST BASE STATION
102 COMMUNICATION DEVICE
100, 200, 240, 250, 300, 400, 500, 600 BASE STATION
10, 601 COMMUNICATION UNIT
20, 21, 22, 23, 27, 28, 29 EXECUTION UNIT
210 FIRST RECEIVING TIMING DETECTION UNIT
211 SECOND RECEIVING TIMING DETECTION UNIT
212, 221, 230, 614 RECEIVING TIMING COMBINATION UNIT
213, 223, 231, 615 SYNCHRONIZATION ERROR DETECTION UNIT
214, 616 SYNCHRONIZATION ERROR CORRECTION UNIT
220, 613 RECEIVING TIMING STORAGE UNIT
24 FIRST RECEPTION LEVEL MEASUREMENT UNIT
25 SECOND RECEPTION LEVEL MEASUREMENT UNIT
26, 605 RECEPTION LEVEL STORAGE UNIT
30, 31 FIRST DETERMINATION UNIT
40, 606 RECEPTION LEVEL COMBINATION UNIT
50, 609 NOISE LEVEL COMBINATION UNIT
60 CALCULATION UNIT
70 MEASUREMENT UNIT
80 SECOND DETERMINATION UNIT
1, 3, 5 Source BS
2, 4, 6, 7 Target BS
602 A/D CONVERSION UNIT
603 Source BS RECEPTION LEVEL MEASUREMENT UNIT
604 Target BS RECEPTION LEVEL MEASUREMENT UNIT
607 Source BS NOISE LEVEL MEASUREMENT UNIT
608 Target BS NOISE LEVEL MEASUREMENT UNIT
610 SYNCHRONIZATION PROCESS DETERMINATION UNIT
611 Source BS RECEIVING TIMING DETECTION UNIT
612 Target BS RECEIVING TIMING DETECTION UNIT

What is claimed is:

1. A base station comprising:
hardware, including a processor and a memory;
a communication unit implemented at least by the hardware and configured to receive a first reference signal transmitted from a first base station and a second reference signal transmitted from a communication device different from the first base station; and
an execution unit implemented at least by the hardware and configured to obtain synchronization between the base station and the first base station based on the first and second reference signals, wherein
the execution unit is further configured to:
obtain a first reception level of the first reference signal and a second reception level of the second reference signal;
obtain a first receiving timing of the first reference signal and a second receiving timing of second reference signal;
calculate a combined receiving timing by combining the first receiving timing with the second receiving timing while using the first and second reception levels as weighting coefficients, respectively, for the first and second receiving timing; and
synchronize with the first base station based on the combined receiving timing.

2. The base station according to claim 1, further comprising a first determination unit implemented at least by the hardware and configured to determine whether or not the base station should synchronize with the first base station based on the first and second reference signals, wherein
the execution unit is further configured to obtain synchronization with the first base station based on a determination result of the first determination unit.

3. The base station according to claim 2, wherein the first determination unit is further configured to determine whether or not the base station should synchronize with the first base station based on a combined reception level calculated based on the first and second reference signals and a combined noise level calculated based on the first and second reference signals.

4. The base station according to claim 3, further comprising:
a reception level combination unit implemented at least by the hardware and configured to calculate the combined reception level by combining the first reception level of the first reference signal and the second reception level of the second reference signal;
a noise level combination unit implemented at least by the hardware and configured to calculate the combined noise level by combining a first noise level of the first reference signal and a second noise level of the second reference signal; and
a calculation unit implemented at least by the hardware and configured to calculate a first threshold by using the combined noise level, wherein
the first determination unit is further configured to determine whether or not the base station should synchronize with the first base station based on the combined reception level and the first threshold.

5. The base station according to claim 2, further comprising a second determination unit implemented at least by the hardware and configured to determine, when the determination result of the first determination unit indicates that the base station should not synchronize with the first base station, whether or not the base station should synchronize with the first base station based on a period during which the base station has not synchronized with the first base station, wherein
the execution unit is further configured to obtain synchronization with the first base station based on a determination result of the second determination unit.

6. The base station according to claim 5, further comprising a measurement unit implemented at least by the hardware and configured to measure the period during which the base station has not synchronized with the first base station, wherein
the second determination unit is configured to determine that the base station should synchronize with the first base station when a measurement result of the measurement unit meets a second threshold, and the execution unit is configured to obtain synchronization with the first base station based on the determination result of the second determination unit.

7. The base station according to claim 1, wherein the first base station is a base station configured to implement a network listening function and is a Source Base Station having a GPS (Global Positioning System) function.

8. The base station according to claim 1, wherein the communication device is a base station configured to implement a network listening function and is a Target Base Station having no GPS function.

9. A communication system comprising a first base station, a communication device different from the first base station, and a base station, wherein
the first base station is configured to transmit a first reference signal to the base station,
the communication device is configured to transmit a second reference signal to the base station, and
the base station comprises:
hardware, including a processor and a memory;
a communication unit implemented at least by the hardware and configured to receive the first and second reference signals; and
an execution unit implemented at least by the hardware and configured to obtain synchronization between the base station and the first base station based on the first and second reference signals, wherein
the execution unit is further configured to:
obtain a first reception level of the first reference signal and a second reception level of the second reference signal;
obtain a first receiving timing of the first reference signal and a second receiving timing of the second reference signal;
calculate a combined receiving timing by combining the first receiving timing with the second receiving timing while using the first and second reception levels as weighting coefficients, respectively, for the first and second receiving timing; and
synchronize with the first base station based on the combined receiving timing.

10. A method comprising:
receiving a first reference signal transmitted from a first base station and a second reference signal transmitted from a communication device different from the first base station; and
obtaining synchronization between the base station and the first base station based on the first and second reference signals, wherein
the obtaining comprises:
obtaining a first reception level of the first reference signal and a second reception level of the second reference signal;
obtaining a first receiving timing of the first reference signal and a second receiving timing of the second reference signal;
calculating a combined receiving timing by combining the first receiving timing with the second receiving timing while using the first and second reception levels as weighting coefficients, respectively, for the first and second receiving timing; and
synchronizing with the first base station based on the combined receiving timing.

* * * * *